(12) United States Patent
Manter et al.

(10) Patent No.: US 11,437,762 B2
(45) Date of Patent: Sep. 6, 2022

(54) HIGH PERFORMANCE CABLE CONNECTOR ASSEMBLY

(71) Applicant: Amphenol Corporation, Wallingford, CT (US)

(72) Inventors: David Manter, Goffstown, NH (US); Vysakh Sivarajan, Nashua, NH (US)

(73) Assignee: Amphenol Corporation, Wallingford, CT (US)

(*) Notice: Subject to any disclaimer, the term of this patent is extended or adjusted under 35 U.S.C. 154(b) by 0 days.

(21) Appl. No.: 16/796,697

(22) Filed: Feb. 20, 2020

(65) Prior Publication Data

US 2020/0274301 A1 Aug. 27, 2020

Related U.S. Application Data

(60) Provisional application No. 62/809,381, filed on Feb. 22, 2019.

(51) Int. Cl.
*H01R 13/658* (2011.01)
*H01R 13/6589* (2011.01)
*H01R 13/6587* (2011.01)
*H01R 13/6593* (2011.01)
(Continued)

(52) U.S. Cl.
CPC ........... *H01R 13/6589* (2013.01); *H01R 4/02* (2013.01); *H01R 4/029* (2013.01); *H01R 13/6587* (2013.01); *H01R 13/6593* (2013.01); *H01R 43/02* (2013.01)

(58) Field of Classification Search
CPC ................................ H01R 4/023; H01R 4/024
See application file for complete search history.

(56) References Cited

U.S. PATENT DOCUMENTS

| 2,124,207 | A | 7/1938 | Carl |
| 2,996,710 | A | 8/1961 | Pratt |
| 3,002,162 | A | 9/1961 | Garstang |

(Continued)

FOREIGN PATENT DOCUMENTS

| CN | 1168547 A | 12/1997 |
| CN | 2519434 Y | 10/2002 |

(Continued)

OTHER PUBLICATIONS

Difference Between Weld Metal and Heat Affected Zone (HAZ), http://www.difference.minaprem.com/joining/difference-between-weld-metal-and-heat-affected-zone-haz/, retrieved Dec. 20, 2021.*

(Continued)

*Primary Examiner* — Ross N Gushi
(74) *Attorney, Agent, or Firm* — Wolf, Greenfield & Sacks, P.C.

(57) ABSTRACT

Connector assemblies that may be used to connect a cable to one or more contact tails of an electrical connector are disclosed. Some connector assemblies may include a wire extending from a cable and attached to an edge of a contact tail of a signal conductor. At least a portion of the wire may be flattened to form a planar surface that is attached to a corresponding planar surface of the edge of the contact tail. Moreover, some connector assemblies may include a wire extending from a cable that is attached to an edge of a contact tail via a metallurgical bond extending along at least a portion of an attachment interface between the wire and the contact tail.

20 Claims, 13 Drawing Sheets

FIG. 1

(51) Int. Cl.
*H01R 4/02* (2006.01)
*H01R 43/02* (2006.01)

(56) References Cited

U.S. PATENT DOCUMENTS

| | | |
|---|---|---|
| 3,007,131 A | 10/1961 | Dahlgren et al. |
| 3,134,950 A | 5/1964 | Cook |
| 3,229,240 A | 1/1966 | Harrison et al. |
| 3,322,885 A | 5/1967 | May et al. |
| 3,594,613 A | 7/1971 | Prietula |
| 3,715,706 A | 2/1973 | Cook et al. |
| 3,786,372 A | 1/1974 | Epis et al. |
| 3,825,874 A | 7/1974 | Peverill |
| 3,863,181 A | 1/1975 | Glance et al. |
| 4,067,039 A | 1/1978 | Stanley |
| 4,083,615 A | 4/1978 | Volinskie |
| 4,155,613 A | 5/1979 | Brandeau |
| 4,157,612 A | 6/1979 | Rainal |
| 4,195,272 A | 3/1980 | Boutros |
| 4,276,523 A | 6/1981 | Boutros et al. |
| 4,307,926 A | 12/1981 | Smith |
| 4,371,742 A | 2/1983 | Manly |
| 4,397,516 A | 8/1983 | Koren et al. |
| 4,408,255 A | 10/1983 | Adkins |
| 4,447,105 A | 5/1984 | Ruehl |
| 4,471,015 A | 9/1984 | Ebneth et al. |
| 4,484,159 A | 11/1984 | Whitley |
| 4,490,283 A | 12/1984 | Kleiner |
| 4,518,651 A | 5/1985 | Wolfe, Jr. |
| 4,519,664 A | 5/1985 | Tillotson |
| 4,519,665 A | 5/1985 | Althouse et al. |
| 4,615,578 A | 10/1986 | Stadler et al. |
| 4,632,476 A | 12/1986 | Schell |
| 4,636,752 A | 1/1987 | Saito |
| 4,639,054 A | 1/1987 | Kersbergen |
| 4,682,129 A | 7/1987 | Bakermans et al. |
| 4,697,862 A | 10/1987 | Hasircoglu |
| 4,708,660 A | 11/1987 | Claeys et al. |
| 4,724,409 A | 2/1988 | Lehman |
| 4,728,762 A | 3/1988 | Roth et al. |
| 4,751,479 A | 6/1988 | Parr |
| 4,761,147 A | 8/1988 | Gauthier |
| 4,795,375 A | 1/1989 | Williams |
| 4,806,107 A | 2/1989 | Arnold et al. |
| 4,826,443 A | 5/1989 | Lockard |
| 4,846,724 A | 7/1989 | Sasaki et al. |
| 4,846,727 A | 7/1989 | Glover et al. |
| 4,871,316 A | 10/1989 | Herrell et al. |
| 4,878,155 A | 10/1989 | Conley |
| 4,889,500 A | 12/1989 | Lazar et al. |
| 4,913,667 A | 4/1990 | Muz |
| 4,924,179 A | 5/1990 | Sherman |
| 4,948,922 A | 8/1990 | Varadan et al. |
| 4,949,379 A | 8/1990 | Cordell |
| 4,970,354 A | 11/1990 | Iwasa et al. |
| 4,975,084 A | 12/1990 | Fedder et al. |
| 4,990,099 A | 2/1991 | Marin et al. |
| 4,992,060 A | 2/1991 | Meyer |
| 5,000,700 A | 3/1991 | Masubuchi et al. |
| RE33,611 E | 6/1991 | Michaels et al. |
| 5,037,330 A | 8/1991 | Fulponi et al. |
| 5,066,236 A | 11/1991 | Broeksteeg |
| 5,091,606 A | 2/1992 | Balsells |
| 5,141,454 A | 8/1992 | Garrett et al. |
| 5,150,086 A | 9/1992 | Ito |
| 5,168,252 A | 12/1992 | Naito |
| 5,168,432 A | 12/1992 | Murphy et al. |
| 5,176,538 A | 1/1993 | Hansell, III et al. |
| 5,190,473 A | 3/1993 | Mroczkowski et al. |
| 5,197,893 A | 3/1993 | Morlion et al. |
| 5,266,055 A | 11/1993 | Naito et al. |
| 5,280,191 A | 1/1994 | Chang |
| 5,280,257 A | 1/1994 | Cravens et al. |
| 5,281,150 A | 1/1994 | Bundga et al. |
| 5,281,762 A | 1/1994 | Long et al. |
| 5,287,076 A | 2/1994 | Johnescu et al. |
| 5,306,171 A | 4/1994 | Marshall |
| 5,332,397 A | 7/1994 | Ingalsbe |
| 5,332,979 A | 7/1994 | Roskewitsch et al. |
| 5,334,050 A | 8/1994 | Andrews |
| 5,340,334 A | 8/1994 | Nguyen |
| 5,346,410 A | 9/1994 | Moore, Jr. |
| 5,387,130 A | 2/1995 | Fedder et al. |
| 5,402,088 A | 3/1995 | Pierro et al. |
| 5,429,520 A | 7/1995 | Morlion et al. |
| 5,429,521 A | 7/1995 | Morlion et al. |
| 5,433,617 A | 7/1995 | Morlion et al. |
| 5,433,618 A | 7/1995 | Morlion et al. |
| 5,435,757 A | 7/1995 | Fedder et al. |
| 5,441,424 A | 8/1995 | Morlion et al. |
| 5,453,026 A | 9/1995 | Ikegami |
| 5,456,619 A | 10/1995 | Belopolsky et al. |
| 5,461,392 A | 10/1995 | Mott et al. |
| 5,480,327 A | 1/1996 | Zola |
| 5,483,020 A | 1/1996 | Hardie et al. |
| 5,484,310 A | 1/1996 | McNamara et al. |
| 5,487,673 A | 1/1996 | Arte |
| 5,495,075 A | 2/1996 | Jonckheere et al. |
| 5,496,183 A | 3/1996 | Soes et al. |
| 5,499,935 A | 3/1996 | Powell |
| 5,509,827 A | 4/1996 | Huppenthal et al. |
| 5,551,893 A | 9/1996 | Johnson |
| 5,554,038 A | 9/1996 | Morlion et al. |
| 5,562,497 A | 10/1996 | Yagi et al. |
| 5,580,264 A | 12/1996 | Aoyama et al. |
| 5,597,328 A | 1/1997 | Mouissie |
| 5,598,627 A | 2/1997 | Saka et al. |
| 5,632,634 A | 5/1997 | Soes |
| 5,637,015 A | 6/1997 | Tan et al. |
| 5,651,702 A | 7/1997 | Hanning et al. |
| 5,669,789 A | 9/1997 | Law |
| 5,691,506 A | 11/1997 | Miyazaki et al. |
| 5,702,258 A | 12/1997 | Provencher et al. |
| 5,733,148 A | 3/1998 | Kaplan et al. |
| 5,743,765 A | 4/1998 | Andrews et al. |
| 5,781,759 A | 7/1998 | Kashiwabara |
| 5,785,555 A | 7/1998 | O'Sullivan et al. |
| 5,796,323 A | 8/1998 | Uchikoba et al. |
| 5,797,770 A | 8/1998 | Davis et al. |
| 5,808,236 A | 9/1998 | Brezina et al. |
| 5,831,491 A | 11/1998 | Buer et al. |
| 5,865,646 A | 2/1999 | Ortega et al. |
| 5,924,890 A | 7/1999 | Morin et al. |
| 5,924,899 A | 7/1999 | Paagman |
| 5,961,348 A | 10/1999 | Murphy |
| 5,981,869 A | 11/1999 | Kroger |
| 5,982,253 A | 11/1999 | Perrin et al. |
| 6,019,616 A | 2/2000 | Yagi et al. |
| 6,022,239 A | 2/2000 | Wright |
| 6,053,770 A | 4/2000 | Blom |
| 6,083,046 A | 7/2000 | Wu et al. |
| 6,095,825 A | 8/2000 | Liao |
| 6,095,872 A | 8/2000 | Lang et al. |
| 6,116,926 A | 9/2000 | Ortega et al. |
| 6,144,559 A | 11/2000 | Johnson et al. |
| 6,146,202 A | 11/2000 | Ramey et al. |
| 6,152,747 A | 11/2000 | McNamara |
| 6,156,975 A | 12/2000 | Roose |
| 6,168,466 B1 | 1/2001 | Chiou |
| 6,168,469 B1 | 1/2001 | Lu |
| 6,174,203 B1 | 1/2001 | Asao |
| 6,174,944 B1 | 1/2001 | Chiba et al. |
| 6,203,376 B1 | 3/2001 | Magajne et al. |
| 6,215,666 B1 | 4/2001 | Hileman et al. |
| 6,217,372 B1 | 4/2001 | Reed |
| 6,238,241 B1 | 5/2001 | Zhu et al. |
| 6,273,753 B1 | 8/2001 | Ko |
| 6,273,758 B1 | 8/2001 | Lloyd et al. |
| 6,283,786 B1 | 9/2001 | Margulis et al. |
| 6,285,542 B1 | 9/2001 | Kennedy, III et al. |
| 6,293,827 B1 | 9/2001 | Stokoe |
| 6,299,438 B1 | 10/2001 | Sahagian et al. |
| 6,299,483 B1 | 10/2001 | Cohen et al. |
| 6,322,379 B1 | 11/2001 | Ortega et al. |

(56) References Cited

U.S. PATENT DOCUMENTS

| | | | |
|---|---|---|---|
| 6,328,601 | B1 | 12/2001 | Yip et al. |
| 6,347,962 | B1 | 2/2002 | Kline |
| 6,350,134 | B1 | 2/2002 | Fogg et al. |
| 6,364,711 | B1 | 4/2002 | Berg et al. |
| 6,364,718 | B1 | 4/2002 | Polgar et al. |
| 6,366,471 | B1 | 4/2002 | Edwards et al. |
| 6,371,788 | B1 | 4/2002 | Bowling et al. |
| 6,375,510 | B2 | 4/2002 | Asao |
| 6,379,188 | B1 | 4/2002 | Cohen et al. |
| 6,380,485 | B1 | 4/2002 | Beaman et al. |
| 6,398,588 | B1 | 6/2002 | Bickford |
| 6,409,543 | B1 | 6/2002 | Astbury, Jr. et al. |
| 6,452,789 | B1 | 9/2002 | Pallotti et al. |
| 6,482,017 | B1 | 11/2002 | Van Doorn |
| 6,489,563 | B1 | 12/2002 | Zhao et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,517,382 | B2 | 2/2003 | Flickinger et al. |
| 6,530,790 | B1 | 3/2003 | McNamara et al. |
| 6,535,367 | B1 | 3/2003 | Carpenter et al. |
| 6,537,086 | B1 | 3/2003 | Mac Mullin |
| 6,537,087 | B2 | 3/2003 | McNamara et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,574,115 | B2 | 6/2003 | Asano et al. |
| 6,575,772 | B1 | 6/2003 | Soubh et al. |
| 6,579,116 | B2 | 6/2003 | Brennan et al. |
| 6,582,244 | B2 | 6/2003 | Fogg et al. |
| 6,592,390 | B1 | 7/2003 | Davis et al. |
| 6,592,401 | B1 | 7/2003 | Gardnet et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,616,864 | B1 | 9/2003 | Jiang et al. |
| 6,648,676 | B1 | 11/2003 | Lee |
| 6,652,296 | B2 | 11/2003 | Kuroda et al. |
| 6,652,318 | B1 | 11/2003 | Winings et al. |
| 6,655,966 | B2 | 12/2003 | Rothermel et al. |
| 6,685,501 | B1 | 2/2004 | Wu et al. |
| 6,692,262 | B1 | 2/2004 | Loveless |
| 6,705,893 | B1 | 3/2004 | Ko |
| 6,709,294 | B1 | 3/2004 | Cohen et al. |
| 6,713,672 | B1 | 3/2004 | Stickney |
| 6,743,057 | B2 | 6/2004 | Davis et al. |
| 6,749,448 | B2 | 6/2004 | Bright et al. |
| 6,776,649 | B2 | 8/2004 | Pape et al. |
| 6,776,659 | B1 | 8/2004 | Stokoe et al. |
| 6,786,771 | B2 | 9/2004 | Gailus |
| 6,797,891 | B1 | 9/2004 | Blair et al. |
| 6,814,619 | B1 | 11/2004 | Stokoe et al. |
| 6,816,376 | B2 | 11/2004 | Bright et al. |
| 6,824,426 | B1 | 11/2004 | Spink, Jr. |
| 6,830,489 | B2 | 12/2004 | Aoyama |
| 6,843,657 | B2 | 1/2005 | Driscoll et al. |
| 6,846,115 | B1 | 1/2005 | Shang et al. |
| 6,872,085 | B1 | 3/2005 | Cohen et al. |
| 6,896,549 | B2 | 5/2005 | Feuerreiter et al. |
| 6,896,556 | B1 | 5/2005 | Wu |
| 6,902,688 | B2 | 6/2005 | Narayan et al. |
| 6,903,934 | B2 | 6/2005 | Lo et al. |
| 6,916,183 | B2 | 7/2005 | Alger et al. |
| 6,932,649 | B1 | 8/2005 | Rothermel et al. |
| 6,955,565 | B2 | 10/2005 | Lloyd et al. |
| 6,971,887 | B1 | 12/2005 | Trobough |
| 6,979,226 | B2 | 12/2005 | Otsu et al. |
| 7,025,634 | B1 | 4/2006 | Swantner et al. |
| 7,044,794 | B2 | 5/2006 | Consoli et al. |
| 7,056,128 | B2 | 6/2006 | Driscoll et al. |
| 7,057,570 | B2 | 6/2006 | Irion, II et al. |
| 7,070,446 | B2 | 7/2006 | Henry et al. |
| 7,074,086 | B2 | 7/2006 | Cohen et al. |
| 7,077,658 | B1 | 7/2006 | Ashman et al. |
| 7,094,102 | B2 | 8/2006 | Cohen et al. |
| 7,108,556 | B2 | 9/2006 | Cohen et al. |
| 7,148,428 | B2 | 12/2006 | Meier et al. |
| 7,158,376 | B2 | 1/2007 | Richardson et al. |
| 7,163,421 | B1 | 1/2007 | Cohen et al. |
| 7,175,444 | B2 | 2/2007 | Lang et al. |
| 7,198,519 | B2 | 4/2007 | Regnier et al. |
| 7,214,097 | B1 | 5/2007 | Hsu et al. |
| 7,223,915 | B2 | 5/2007 | Hackman |
| 7,234,944 | B2 | 6/2007 | Nordin et al. |
| 7,244,137 | B2 | 7/2007 | Renfro et al. |
| 7,267,515 | B2 | 9/2007 | Lappöhn |
| 7,280,372 | B2 | 10/2007 | Grundy et al. |
| 7,285,018 | B2 | 10/2007 | Kenny et al. |
| 7,303,438 | B2 | 12/2007 | Dawiedczyk et al. |
| 7,307,293 | B2 | 12/2007 | Fjelstad et al. |
| 7,331,816 | B2 | 2/2008 | Krohn et al. |
| 7,331,830 | B2 | 2/2008 | Minich |
| 7,335,063 | B2 | 2/2008 | Cohen et al. |
| 7,354,274 | B2 | 4/2008 | Minich |
| 7,371,117 | B2 | 5/2008 | Gailus |
| 7,384,275 | B2 | 6/2008 | Ngo |
| 7,402,048 | B2 | 7/2008 | Meier et al. |
| 7,422,483 | B2 | 9/2008 | Avery et al. |
| 7,431,608 | B2 | 10/2008 | Sakaguchi et al. |
| 7,445,471 | B1 | 11/2008 | Scherer et al. |
| 7,448,897 | B2 | 11/2008 | Dawiedczyk et al. |
| 7,462,942 | B2 | 12/2008 | Tan et al. |
| 7,485,012 | B2 | 2/2009 | Daugherty et al. |
| 7,494,383 | B2 | 2/2009 | Cohen et al. |
| 7,510,439 | B2 | 3/2009 | Gordon et al. |
| 7,534,142 | B2 | 5/2009 | Avery et al. |
| 7,540,781 | B2 | 6/2009 | Kenny et al. |
| 7,549,897 | B2 | 6/2009 | Fedder et al. |
| 7,575,471 | B2 | 8/2009 | Long |
| 7,581,990 | B2 | 9/2009 | Kirk et al. |
| 7,585,188 | B2 | 9/2009 | Regnier |
| 7,588,464 | B2 | 9/2009 | Kim |
| 7,613,011 | B2 | 11/2009 | Grundy et al. |
| 7,621,779 | B2 | 11/2009 | Laurx et al. |
| 7,652,381 | B2 | 1/2010 | Grundy et al. |
| 7,654,831 | B1 | 2/2010 | Wu |
| 7,658,654 | B2 | 2/2010 | Ohyama et al. |
| 7,686,659 | B2 | 3/2010 | Peng |
| 7,690,930 | B2 | 4/2010 | Chen et al. |
| 7,713,077 | B1 | 5/2010 | McGowan et al. |
| 7,719,843 | B2 | 5/2010 | Dunham |
| 7,722,401 | B2 | 5/2010 | Kirk et al. |
| 7,731,537 | B2 | 6/2010 | Amleshi et al. |
| 7,744,414 | B2 | 6/2010 | Scherer et al. |
| 7,753,731 | B2 | 7/2010 | Cohen et al. |
| 7,771,233 | B2 | 8/2010 | Gailus |
| 7,775,802 | B2 | 8/2010 | Defibaugh et al. |
| 7,781,294 | B2 | 8/2010 | Mauder et al. |
| 7,789,676 | B2 | 9/2010 | Morgan et al. |
| 7,794,240 | B2 | 9/2010 | Cohen et al. |
| 7,794,278 | B2 | 9/2010 | Cohen et al. |
| 7,806,698 | B2 | 10/2010 | Regnier |
| 7,811,129 | B2 | 10/2010 | Glover et al. |
| 7,819,675 | B2 | 10/2010 | Ko et al. |
| 7,824,197 | B1 | 11/2010 | Westman et al. |
| 7,857,630 | B2 | 12/2010 | Hermant et al. |
| 7,862,344 | B2 | 1/2011 | Morgan et al. |
| 7,871,294 | B2 | 1/2011 | Long |
| 7,871,296 | B2 | 1/2011 | Fowler et al. |
| 7,874,873 | B2 | 1/2011 | Do et al. |
| 7,887,371 | B2 | 2/2011 | Kenny et al. |
| 7,906,730 | B2 | 3/2011 | Atkinson et al. |
| 7,914,304 | B2 | 3/2011 | Cartier et al. |
| 7,976,318 | B2 | 7/2011 | Fedder et al. |
| 7,985,097 | B2 | 7/2011 | Gulla |
| 7,993,147 | B2 | 8/2011 | Cole et al. |
| 8,002,581 | B1 | 8/2011 | Whiteman, Jr. et al. |
| 8,016,616 | B2 | 9/2011 | Glover et al. |
| 8,018,733 | B2 | 9/2011 | Jia |
| 8,036,500 | B2 | 10/2011 | McColloch |
| 8,057,267 | B2 | 11/2011 | Johnescu |
| 8,083,553 | B2 | 12/2011 | Manter et al. |
| 8,100,699 | B1 | 1/2012 | Costello |
| 8,157,573 | B2 | 4/2012 | Tanaka |

(56) References Cited

U.S. PATENT DOCUMENTS

| | | |
|---|---|---|
| 8,162,675 B2 | 4/2012 | Regnier et al. |
| RE43,427 E | 5/2012 | Dawiedczyk et al. |
| 8,167,651 B2 | 5/2012 | Glover et al. |
| 8,182,289 B2 | 5/2012 | Stokoe et al. |
| 8,192,222 B2 | 6/2012 | Kameyama |
| 8,197,285 B2 | 6/2012 | Farmer |
| 8,210,877 B2 | 7/2012 | Droesbeke |
| 8,215,968 B2 | 7/2012 | Cartier et al. |
| 8,226,441 B2 | 7/2012 | Regnier et al. |
| 8,251,745 B2 | 8/2012 | Johnescu et al. |
| 8,253,021 B2 | 8/2012 | Adachi et al. |
| 8,272,877 B2 | 9/2012 | Stokoe et al. |
| 8,308,491 B2 | 11/2012 | Nichols et al. |
| 8,308,512 B2 | 11/2012 | Ritter et al. |
| 8,337,243 B2 | 12/2012 | Elkhatib et al. |
| 8,338,713 B2 | 12/2012 | Fjelstad et al. |
| 8,360,805 B2 | 1/2013 | Schwarz |
| 8,371,875 B2 | 2/2013 | Gailus |
| 8,371,876 B2 | 2/2013 | Davis |
| 8,382,524 B2 | 2/2013 | Khilchenko et al. |
| 8,398,433 B1 | 3/2013 | Yang |
| 8,419,472 B1 | 4/2013 | Swanger et al. |
| 8,439,704 B2 | 5/2013 | Reed |
| 8,449,312 B2 | 5/2013 | Lang et al. |
| 8,449,330 B1 | 5/2013 | Schroll et al. |
| 8,465,302 B2 | 6/2013 | Regnier et al. |
| 8,465,320 B2 | 6/2013 | Long |
| 8,469,738 B2 | 6/2013 | Long |
| 8,469,745 B2 | 6/2013 | Davis et al. |
| 8,475,210 B2 | 7/2013 | Wang et al. |
| 8,535,065 B2 | 9/2013 | Costello et al. |
| 8,540,525 B2 | 9/2013 | Regnier et al. |
| 8,550,861 B2 | 10/2013 | Cohen et al. |
| 8,553,102 B2 | 10/2013 | Yamada |
| 8,556,657 B1 | 10/2013 | Nichols |
| 8,588,561 B2 | 11/2013 | Zbinden et al. |
| 8,588,562 B2 | 11/2013 | Zbinden et al. |
| 8,597,045 B2 | 12/2013 | Zhu et al. |
| 8,597,055 B2 | 12/2013 | Regnier et al. |
| 8,657,627 B2 | 2/2014 | McNamara et al. |
| 8,672,707 B2 | 3/2014 | Nichols et al. |
| 8,678,860 B2 | 3/2014 | Minich et al. |
| 8,690,604 B2 | 4/2014 | Davis |
| 8,696,378 B2 | 4/2014 | Behziz et al. |
| 8,715,003 B2 | 5/2014 | Buck et al. |
| 8,740,644 B2 | 6/2014 | Long |
| 8,753,145 B2 | 6/2014 | Lang et al. |
| 8,758,051 B2 | 6/2014 | Nonen et al. |
| 8,771,016 B2 | 7/2014 | Atkinson et al. |
| 8,772,636 B2 | 7/2014 | Yamaguchi et al. |
| 8,787,711 B2 | 7/2014 | Zbinden et al. |
| 8,804,342 B2 | 8/2014 | Behziz et al. |
| 8,814,595 B2 | 8/2014 | Cohen et al. |
| 8,845,364 B2 | 9/2014 | Wanha et al. |
| 8,864,521 B2 | 10/2014 | Atkinson et al. |
| 8,870,597 B2 | 10/2014 | Kawakami |
| D718,253 S | 11/2014 | Zerebilov et al. |
| 8,888,531 B2 | 11/2014 | Jeon |
| 8,888,533 B2 | 11/2014 | Westman et al. |
| 8,911,255 B2 | 12/2014 | Scherer et al. |
| D720,698 S | 1/2015 | Zerebilov et al. |
| 8,926,377 B2 | 1/2015 | Kirk et al. |
| 8,944,831 B2 | 2/2015 | Stoner et al. |
| 8,992,236 B2 | 3/2015 | Wittig et al. |
| 8,992,237 B2 | 3/2015 | Regnier et al. |
| 8,998,642 B2 | 4/2015 | Manter et al. |
| 9,004,942 B2 | 4/2015 | Paniauqa |
| 9,011,177 B2 | 4/2015 | Lloyd et al. |
| 9,022,806 B2 | 5/2015 | Girard, Jr. et al. |
| 9,028,201 B2 | 5/2015 | Kirk et al. |
| 9,028,281 B2 | 5/2015 | Kirk et al. |
| 9,035,183 B2 | 5/2015 | Kodama et al. |
| 9,035,200 B2 | 5/2015 | Kato et al. |
| 9,040,824 B2 | 5/2015 | Guetig et al. |
| 9,071,001 B2 | 6/2015 | Scherer et al. |
| 9,118,151 B2 | 8/2015 | Tran et al. |
| 9,119,292 B2 | 8/2015 | Gundel |
| 9,124,009 B2 | 9/2015 | Atkinson et al. |
| 9,142,921 B2 | 9/2015 | Wanha et al. |
| 9,203,171 B2 | 12/2015 | Yu et al. |
| 9,210,817 B2 | 12/2015 | Briant et al. |
| 9,214,768 B2 | 12/2015 | Pao et al. |
| 9,219,335 B2 | 12/2015 | Atkinson et al. |
| 9,225,085 B2 | 12/2015 | Girard, Jr. et al. |
| 9,232,676 B2 | 1/2016 | Sechrist et al. |
| 9,246,251 B2 | 1/2016 | Regnier et al. |
| 9,246,262 B2 | 1/2016 | Brown et al. |
| 9,246,278 B1 | 1/2016 | Dunwoody et al. |
| 9,246,280 B2 | 1/2016 | Neer et al. |
| D750,030 S | 2/2016 | Zerebilov et al. |
| 9,257,778 B2 | 2/2016 | Buck et al. |
| 9,257,794 B2 | 2/2016 | Wanha et al. |
| 9,276,358 B2 | 3/2016 | Ista et al. |
| 9,312,618 B2 | 4/2016 | Regnier et al. |
| 9,350,108 B2 | 5/2016 | Long |
| 9,356,401 B1 | 5/2016 | Horning et al. |
| 9,362,678 B2 | 6/2016 | Wanha et al. |
| 9,373,917 B2 | 6/2016 | Sypolt et al. |
| 9,374,165 B2 | 6/2016 | Zbinden et al. |
| 9,385,455 B2 | 7/2016 | Regnier et al. |
| 9,389,368 B1 | 7/2016 | Sharf |
| 9,391,407 B1 | 7/2016 | Bucher et al. |
| 9,413,112 B2 | 8/2016 | Helster et al. |
| 9,450,344 B2 | 9/2016 | Cartier, Jr. et al. |
| 9,490,558 B2 | 11/2016 | Wanha et al. |
| 9,509,101 B2 | 11/2016 | Cartier et al. |
| 9,509,102 B2 | 11/2016 | Sharf et al. |
| 9,520,689 B2 | 12/2016 | Cartier, Jr. et al. |
| 9,531,133 B1 | 12/2016 | Horning et al. |
| 9,553,381 B2 | 1/2017 | Regnier |
| 9,559,446 B1 | 1/2017 | Wetzel et al. |
| 9,564,696 B2 | 2/2017 | Gulla |
| 9,608,348 B2 | 3/2017 | Wanha et al. |
| 9,651,752 B2 | 5/2017 | Zbinden et al. |
| 9,653,829 B2 | 5/2017 | Long |
| 9,660,364 B2 | 5/2017 | Wig et al. |
| 9,666,961 B2 | 5/2017 | Horning et al. |
| 9,671,582 B2 | 6/2017 | Yeh et al. |
| 9,685,736 B2 | 6/2017 | Gailus et al. |
| 9,711,901 B2 | 7/2017 | Scholeno |
| 9,735,484 B2 | 8/2017 | Brubaker et al. |
| 9,735,495 B2 | 8/2017 | Gross |
| 9,741,465 B2 | 8/2017 | Gross et al. |
| 9,774,144 B2 | 9/2017 | Cartier, Jr. et al. |
| 9,801,301 B1 | 10/2017 | Costello |
| 9,829,662 B2 | 11/2017 | Kurashima |
| 9,841,572 B2 | 12/2017 | Zbinden et al. |
| 9,843,135 B2 | 12/2017 | Guetig et al. |
| 9,929,500 B1 | 3/2018 | Ista |
| 9,929,512 B1 | 3/2018 | Trout et al. |
| D816,044 S | 4/2018 | Zerebilov et al. |
| 9,966,165 B2 | 5/2018 | Gross et al. |
| 9,985,367 B2 | 5/2018 | Wanha et al. |
| 9,985,389 B1 | 5/2018 | Morgan et al. |
| 10,020,614 B1 | 7/2018 | Bucher |
| 10,056,706 B2 | 8/2018 | Wanha et al. |
| 10,062,984 B2 | 8/2018 | Regnier |
| 10,069,225 B2 | 9/2018 | Wanha et al. |
| 10,096,945 B2 | 10/2018 | Cartier, Jr. et al. |
| 10,109,937 B2 | 10/2018 | Zerebilov et al. |
| 10,109,968 B2 | 10/2018 | Khazen et al. |
| 10,128,627 B1 | 11/2018 | Kazav et al. |
| 10,170,869 B2 | 1/2019 | Gailus et al. |
| 10,181,663 B2 | 1/2019 | Regnier |
| 10,205,286 B2 | 2/2019 | Provencher et al. |
| 10,276,995 B2 | 4/2019 | Little |
| 10,305,224 B2 | 5/2019 | Girard |
| 10,312,638 B2 | 6/2019 | Girard, Jr. |
| 10,374,355 B2 | 8/2019 | Ayzenberg et al. |
| 2001/0012730 A1 | 8/2001 | Ramey et al. |
| 2001/0031579 A1 | 10/2001 | Fujino et al. |
| 2001/0042632 A1 | 11/2001 | Manov et al. |
| 2001/0046810 A1 | 11/2001 | Cohen et al. |
| 2002/0042223 A1 | 4/2002 | Belopolsky et al. |

(56) References Cited

U.S. PATENT DOCUMENTS

| | | |
|---|---|---|
| 2002/0088628 A1 | 7/2002 | Chen |
| 2002/0089464 A1 | 7/2002 | Joshi |
| 2002/0098738 A1 | 7/2002 | Astbury et al. |
| 2002/0111068 A1 | 8/2002 | Cohen et al. |
| 2002/0111069 A1 | 8/2002 | Astbury et al. |
| 2002/0136519 A1 | 9/2002 | Tinucci et al. |
| 2002/0157865 A1 | 10/2002 | Noda |
| 2002/0187688 A1 | 12/2002 | Edwards et al. |
| 2002/0197043 A1 | 12/2002 | Hwang |
| 2003/0045140 A1 | 3/2003 | Syed et al. |
| 2003/0073331 A1 | 4/2003 | Peloza et al. |
| 2003/0119362 A1 | 6/2003 | Nelson et al. |
| 2003/0186580 A1 | 10/2003 | Dambach et al. |
| 2004/0002262 A1 | 1/2004 | Murayama et al. |
| 2004/0005815 A1 | 1/2004 | Mizumura et al. |
| 2004/0018757 A1 | 1/2004 | Lang et al. |
| 2004/0020674 A1 | 2/2004 | McFadden et al. |
| 2004/0092164 A1 | 5/2004 | Lee |
| 2004/0094328 A1 | 5/2004 | Fjelstad et al. |
| 2004/0110421 A1 | 6/2004 | Broman et al. |
| 2004/0115968 A1 | 6/2004 | Cohen |
| 2004/0121633 A1 | 6/2004 | David et al. |
| 2004/0121652 A1 | 6/2004 | Gailus |
| 2004/0127078 A1 | 7/2004 | Tondreault et al. |
| 2004/0155328 A1 | 8/2004 | Kline |
| 2004/0185708 A1 | 9/2004 | Kuwahara |
| 2004/0196112 A1 | 10/2004 | Welbon et al. |
| 2004/0224559 A1 | 11/2004 | Nelson et al. |
| 2004/0229510 A1 | 11/2004 | Lloyd et al. |
| 2004/0259419 A1 | 12/2004 | Payne et al. |
| 2004/0264894 A1 | 12/2004 | Cooke et al. |
| 2005/0006126 A1 | 1/2005 | Aisenbrey |
| 2005/0032430 A1 | 2/2005 | Otsu et al. |
| 2005/0070160 A1 | 3/2005 | Cohen et al. |
| 2005/0087359 A1 | 4/2005 | Tachibana et al. |
| 2005/0093127 A1 | 5/2005 | Fjelstad et al. |
| 2005/0118869 A1 | 6/2005 | Evans |
| 2005/0133245 A1 | 6/2005 | Katsuyama et al. |
| 2005/0142944 A1 | 6/2005 | Ling et al. |
| 2005/0153584 A1 | 7/2005 | Bartley et al. |
| 2005/0176835 A1 | 8/2005 | Kobayashi et al. |
| 2005/0233610 A1 | 10/2005 | Tutt et al. |
| 2005/0239339 A1 | 10/2005 | Pepe |
| 2005/0283974 A1 | 12/2005 | Richard et al. |
| 2005/0287869 A1 | 12/2005 | Kenny et al. |
| 2006/0001163 A1 | 1/2006 | Kolbehdari et al. |
| 2006/0068640 A1 | 3/2006 | Gailus |
| 2006/0079119 A1 | 4/2006 | Wu |
| 2006/0091507 A1 | 5/2006 | Fjelstad et al. |
| 2006/0160429 A1 | 7/2006 | Dawiedczyk et al. |
| 2006/0216969 A1 | 9/2006 | Bright et al. |
| 2006/0228922 A1 | 10/2006 | Morriss |
| 2006/0249820 A1 | 11/2006 | Ice et al. |
| 2007/0004282 A1 | 1/2007 | Cohen et al. |
| 2007/0021001 A1 | 1/2007 | Laurx et al. |
| 2007/0021002 A1 | 1/2007 | Laurx et al. |
| 2007/0032104 A1 | 2/2007 | Yamada et al. |
| 2007/0037419 A1 | 2/2007 | Sparrowhawk |
| 2007/0042639 A1 | 2/2007 | Manter et al. |
| 2007/0054554 A1 | 3/2007 | Do et al. |
| 2007/0059961 A1 | 3/2007 | Cartier et al. |
| 2007/0099486 A1 | 5/2007 | Kameyama |
| 2007/0155241 A1 | 7/2007 | Lappöhn |
| 2007/0197095 A1 | 8/2007 | Feldman et al. |
| 2007/0207641 A1 | 9/2007 | Minich |
| 2007/0218765 A1 | 9/2007 | Cohen et al. |
| 2007/0243741 A1 | 10/2007 | Yang |
| 2007/0254517 A1 | 11/2007 | Olson et al. |
| 2007/0287332 A1 | 12/2007 | Gordon et al. |
| 2008/0026638 A1 | 1/2008 | Cohen et al. |
| 2008/0194146 A1 | 8/2008 | Gailus |
| 2008/0200955 A1 | 8/2008 | Tepic |
| 2008/0207023 A1 | 8/2008 | Tuin et al. |
| 2008/0246555 A1 | 10/2008 | Kirk et al. |
| 2008/0248658 A1 | 10/2008 | Cohen et al. |
| 2008/0248659 A1 | 10/2008 | Cohen et al. |
| 2008/0248660 A1 | 10/2008 | Kirk et al. |
| 2008/0264673 A1 | 10/2008 | Chi et al. |
| 2008/0267620 A1 | 10/2008 | Cole et al. |
| 2008/0297988 A1 | 12/2008 | Chau |
| 2008/0305689 A1 | 12/2008 | Zhang et al. |
| 2009/0011641 A1 | 1/2009 | Cohen et al. |
| 2009/0011645 A1 | 1/2009 | Laurx et al. |
| 2009/0011664 A1 | 1/2009 | Laurx et al. |
| 2009/0017682 A1 | 1/2009 | Amleshi et al. |
| 2009/0023330 A1 | 1/2009 | Stoner et al. |
| 2009/0051558 A1 | 2/2009 | Dorval |
| 2009/0098767 A1 | 4/2009 | Long |
| 2009/0117386 A1 | 5/2009 | Vacanti et al. |
| 2009/0130913 A1 | 5/2009 | Yi et al. |
| 2009/0130918 A1 | 5/2009 | Nguyen et al. |
| 2009/0166082 A1 | 7/2009 | Liu et al. |
| 2009/0176400 A1 | 7/2009 | Davis et al. |
| 2009/0188716 A1 | 7/2009 | Nagase |
| 2009/0205194 A1 | 8/2009 | Semba et al. |
| 2009/0215309 A1 | 8/2009 | Mongold et al. |
| 2009/0227141 A1 | 9/2009 | Pan |
| 2009/0239395 A1 | 9/2009 | Cohen et al. |
| 2009/0247012 A1 | 10/2009 | Pan |
| 2009/0291593 A1 | 11/2009 | Atkinson et al. |
| 2009/0305533 A1 | 12/2009 | Feldman et al. |
| 2009/0311908 A1 | 12/2009 | Fogg et al. |
| 2010/0009571 A1 | 1/2010 | Scherer et al. |
| 2010/0018738 A1 | 1/2010 | Chen et al. |
| 2010/0078738 A1 | 4/2010 | Chambers et al. |
| 2010/0081302 A1 | 4/2010 | Atkinson et al. |
| 2010/0099299 A1 | 4/2010 | Moriyama et al. |
| 2010/0112850 A1 | 5/2010 | Rao et al. |
| 2010/0144167 A1 | 6/2010 | Fedder et al. |
| 2010/0144168 A1 | 6/2010 | Glover et al. |
| 2010/0144175 A1 | 6/2010 | Helster et al. |
| 2010/0144201 A1 | 6/2010 | Defibaugh et al. |
| 2010/0144203 A1 | 6/2010 | Glover et al. |
| 2010/0177489 A1 | 7/2010 | Yagisawa |
| 2010/0183141 A1 | 7/2010 | Arai et al. |
| 2010/0203768 A1 | 8/2010 | Kondo et al. |
| 2010/0221951 A1 | 9/2010 | Pepe et al. |
| 2010/0248544 A1 | 9/2010 | Xu et al. |
| 2010/0291806 A1 | 11/2010 | Minich et al. |
| 2010/0294530 A1 | 11/2010 | Atkinson et al. |
| 2011/0003509 A1 | 1/2011 | Gailus |
| 2011/0059643 A1 | 3/2011 | Kuwahara et al. |
| 2011/0074213 A1 | 3/2011 | Schaffer et al. |
| 2011/0081114 A1 | 4/2011 | Togami et al. |
| 2011/0104948 A1 | 5/2011 | Girard, Jr. et al. |
| 2011/0130038 A1 | 6/2011 | Cohen et al. |
| 2011/0177699 A1 | 7/2011 | Crofoot et al. |
| 2011/0212632 A1 | 9/2011 | Stoke et al. |
| 2011/0212633 A1 | 9/2011 | Regnier et al. |
| 2011/0212649 A1 | 9/2011 | Stokoe et al. |
| 2011/0212650 A1 | 9/2011 | Amleshi et al. |
| 2011/0223807 A1 | 9/2011 | Jeon et al. |
| 2011/0230095 A1 | 9/2011 | Atkinson et al. |
| 2011/0230096 A1 | 9/2011 | Atkinson et al. |
| 2011/0230104 A1 | 9/2011 | Lang et al. |
| 2011/0263156 A1 | 10/2011 | Ko |
| 2011/0287663 A1 | 11/2011 | Gailus et al. |
| 2011/0300757 A1 | 12/2011 | Regnier et al. |
| 2012/0003848 A1 | 1/2012 | Casher et al. |
| 2012/0034820 A1 | 2/2012 | Lang et al. |
| 2012/0052712 A1 | 3/2012 | Wang et al. |
| 2012/0058665 A1 | 3/2012 | Zerebilov et al. |
| 2012/0064762 A1 | 3/2012 | Muroi et al. |
| 2012/0064779 A1 | 3/2012 | Wu |
| 2012/0077369 A1 | 3/2012 | Andersen |
| 2012/0077380 A1 | 3/2012 | Minich et al. |
| 2012/0094531 A1 | 4/2012 | Mathews |
| 2012/0094536 A1 | 4/2012 | Khilchenko et al. |
| 2012/0135643 A1 | 5/2012 | Lange et al. |
| 2012/0145429 A1 | 6/2012 | Nordin et al. |
| 2012/0156929 A1 | 6/2012 | Manter et al. |
| 2012/0164860 A1 | 6/2012 | Wang et al. |
| 2012/0184136 A1 | 7/2012 | Ritter |
| 2012/0202363 A1 | 8/2012 | McNamara et al. |

(56) References Cited

U.S. PATENT DOCUMENTS

| | | |
|---|---|---|
| 2012/0202386 A1 | 8/2012 | McNamara et al. |
| 2012/0214344 A1 | 8/2012 | Cohen et al. |
| 2012/0252266 A1 | 10/2012 | Ling et al. |
| 2012/0329294 A1 | 12/2012 | Raybold et al. |
| 2013/0012038 A1 | 1/2013 | Kirk et al. |
| 2013/0017712 A1 | 1/2013 | Liu et al. |
| 2013/0017715 A1 | 1/2013 | Laarhoven et al. |
| 2013/0017733 A1 | 1/2013 | Kirk et al. |
| 2013/0034977 A1 | 2/2013 | Cina et al. |
| 2013/0034999 A1 | 2/2013 | Szczesny et al. |
| 2013/0078870 A1 | 3/2013 | Milbrand, Jr. |
| 2013/0092429 A1 | 4/2013 | Ellison |
| 2013/0109232 A1 | 5/2013 | Paniaqua |
| 2013/0130547 A1 | 5/2013 | Simpson et al. |
| 2013/0143442 A1 | 6/2013 | Cohen et al. |
| 2013/0149899 A1 | 6/2013 | Schroll et al. |
| 2013/0188325 A1 | 7/2013 | Garman et al. |
| 2013/0196553 A1 | 8/2013 | Gailus |
| 2013/0210246 A1 | 8/2013 | Davis et al. |
| 2013/0223036 A1 | 8/2013 | Herring et al. |
| 2013/0225006 A1 | 8/2013 | Khilchenko et al. |
| 2013/0270000 A1 | 10/2013 | Buck et al. |
| 2013/0273781 A1 | 10/2013 | Buck et al. |
| 2013/0288521 A1 | 10/2013 | McClellan et al. |
| 2013/0288525 A1 | 10/2013 | McClellan et al. |
| 2013/0288539 A1 | 10/2013 | McClellan et al. |
| 2013/0340251 A1 | 12/2013 | Regnier et al. |
| 2014/0004724 A1 | 1/2014 | Cartier, Jr. et al. |
| 2014/0004726 A1 | 1/2014 | Cartier, Jr. et al. |
| 2014/0004746 A1 | 1/2014 | Cartier, Jr. et al. |
| 2014/0017944 A1 | 1/2014 | Wu et al. |
| 2014/0030905 A1 | 1/2014 | Phillips et al. |
| 2014/0035755 A1 | 2/2014 | Ward et al. |
| 2014/0041937 A1 | 2/2014 | Lloyd et al. |
| 2014/0057493 A1 | 2/2014 | De Geest et al. |
| 2014/0057494 A1 | 2/2014 | Cohen |
| 2014/0057498 A1 | 2/2014 | Cohen |
| 2014/0065883 A1 | 3/2014 | Cohen et al. |
| 2014/0073174 A1 | 3/2014 | Yang |
| 2014/0073181 A1 | 3/2014 | Yang |
| 2014/0099844 A1 | 4/2014 | Dunham |
| 2014/0154927 A1 | 6/2014 | Nonen et al. |
| 2014/0182885 A1 | 7/2014 | Gross et al. |
| 2014/0182890 A1 | 7/2014 | Gross et al. |
| 2014/0193993 A1 | 7/2014 | Meng et al. |
| 2014/0206230 A1 | 7/2014 | Rost et al. |
| 2014/0242844 A1 | 8/2014 | Wanha et al. |
| 2014/0273551 A1 | 9/2014 | Resendez et al. |
| 2014/0273557 A1 | 9/2014 | Cartier, Jr. et al. |
| 2014/0273627 A1 | 9/2014 | Cartier, Jr. et al. |
| 2014/0287627 A1 | 9/2014 | Cohen |
| 2014/0308852 A1 | 10/2014 | Gulla |
| 2014/0335707 A1 | 11/2014 | Johnescu et al. |
| 2014/0335736 A1 | 11/2014 | Regnier et al. |
| 2015/0056856 A1 | 2/2015 | Atkinson et al. |
| 2015/0079829 A1 | 3/2015 | Brodsgaard |
| 2015/0079845 A1 | 3/2015 | Wanha et al. |
| 2015/0093083 A1 | 4/2015 | Tsai et al. |
| 2015/0180578 A1 | 6/2015 | Leigh et al. |
| 2015/0194751 A1 | 7/2015 | Herring |
| 2015/0200496 A1 | 7/2015 | Simpson et al. |
| 2015/0207247 A1 | 7/2015 | Regnier et al. |
| 2015/0214666 A1 | 7/2015 | Schumacher |
| 2015/0236450 A1 | 8/2015 | Davis |
| 2015/0236451 A1 | 8/2015 | Cartier, Jr. et al. |
| 2015/0236452 A1 | 8/2015 | Cartier, Jr. et al. |
| 2015/0255926 A1 | 9/2015 | Paniagua |
| 2015/0280351 A1 | 10/2015 | Bertsch |
| 2015/0288108 A1 | 10/2015 | Fischer |
| 2015/0303608 A1 | 10/2015 | Zerebilov et al. |
| 2015/0357736 A1 | 12/2015 | Tran et al. |
| 2015/0357761 A1 | 12/2015 | Wanha et al. |
| 2016/0004022 A1 | 1/2016 | Ishii et al. |
| 2016/0013594 A1 | 1/2016 | Costello et al. |
| 2016/0013596 A1 | 1/2016 | Regnier |
| 2016/0018606 A1 | 1/2016 | Xue et al. |
| 2016/0028189 A1 | 1/2016 | Resendez et al. |
| 2016/0049746 A1 | 2/2016 | Gross |
| 2016/0054527 A1 | 2/2016 | Tang et al. |
| 2016/0056553 A1 | 2/2016 | Brubaker et al. |
| 2016/0104948 A1 | 4/2016 | Droesbeke et al. |
| 2016/0104956 A1 | 4/2016 | Santos et al. |
| 2016/0111825 A1 | 4/2016 | Wanha et al. |
| 2016/0118745 A1 | 4/2016 | Droesbeke et al. |
| 2016/0131859 A1 | 5/2016 | Ishii et al. |
| 2016/0141807 A1 | 5/2016 | Gailus et al. |
| 2016/0149343 A1 | 5/2016 | Atkinson et al. |
| 2016/0149362 A1 | 5/2016 | Ritter et al. |
| 2016/0150633 A1 | 5/2016 | Cartier, Jr. |
| 2016/0150639 A1 | 5/2016 | Gailus et al. |
| 2016/0150645 A1 | 5/2016 | Gailus et al. |
| 2016/0181713 A1 | 6/2016 | Peloza et al. |
| 2016/0181732 A1 | 6/2016 | Laurx et al. |
| 2016/0190747 A1 | 6/2016 | Regnier et al. |
| 2016/0197423 A1 | 7/2016 | Regnier |
| 2016/0218455 A1 | 7/2016 | Sayre et al. |
| 2016/0233598 A1 | 8/2016 | Wittig |
| 2016/0268714 A1 | 9/2016 | Wanha et al. |
| 2016/0268739 A1 | 9/2016 | Zerebilov et al. |
| 2016/0274316 A1 | 9/2016 | Verdiell |
| 2016/0308296 A1 | 10/2016 | Pitten et al. |
| 2016/0322770 A1 | 11/2016 | Zerebilov |
| 2016/0344141 A1 | 11/2016 | Cartier et al. |
| 2017/0025783 A1 | 1/2017 | Astbury et al. |
| 2017/0033478 A1 | 2/2017 | Wanha et al. |
| 2017/0042070 A1 | 2/2017 | Baumler et al. |
| 2017/0047692 A1 | 2/2017 | Cartier et al. |
| 2017/0077643 A1 | 3/2017 | Zbinden et al. |
| 2017/0093093 A1 | 3/2017 | Cartier, Jr. et al. |
| 2017/0098901 A1 | 4/2017 | Regnier |
| 2017/0162960 A1 | 6/2017 | Wanha et al. |
| 2017/0294743 A1 | 10/2017 | Gailus et al. |
| 2017/0302011 A1 | 10/2017 | Wanha et al. |
| 2017/0302030 A1 | 10/2017 | Chiang et al. |
| 2017/0338595 A1 | 11/2017 | Girard, Jr. |
| 2017/0346234 A1 | 11/2017 | Girard |
| 2017/0365942 A1 | 12/2017 | Regnier |
| 2017/0365943 A1 | 12/2017 | Wanha et al. |
| 2018/0006416 A1 | 1/2018 | Lloyd et al. |
| 2018/0034175 A1 | 2/2018 | Lloyd et al. |
| 2018/0034190 A1 | 2/2018 | Ngo |
| 2018/0040989 A1 | 2/2018 | Chen |
| 2018/0062323 A1 | 3/2018 | Kirk et al. |
| 2018/0089966 A1 | 3/2018 | Ward et al. |
| 2018/0109043 A1 | 4/2018 | Provencher et al. |
| 2018/0145438 A1 | 5/2018 | Cohen |
| 2018/0212385 A1 | 7/2018 | Little |
| 2018/0219331 A1 | 8/2018 | Cartier, Jr. et al. |
| 2018/0219332 A1 | 8/2018 | Brungard et al. |
| 2018/0278000 A1 | 9/2018 | Regnier |
| 2018/0287280 A1 | 10/2018 | Ratkovic et al. |
| 2018/0309214 A1 | 10/2018 | Lloyd et al. |
| 2018/0366880 A1 | 12/2018 | Zerebilov et al. |
| 2019/0013617 A1 | 1/2019 | Ayzenberg et al. |
| 2019/0013625 A1 | 1/2019 | Gailus et al. |
| 2019/0020155 A1 | 1/2019 | Trout et al. |
| 2019/0044284 A1 | 2/2019 | Dunham |
| 2019/0044285 A1* | 2/2019 | Dunham .............. H01R 12/728 |
| 2019/0157812 A1 | 5/2019 | Gailus et al. |
| 2019/0173236 A1 | 6/2019 | Provencher et al. |
| 2019/0252832 A1 | 8/2019 | Girard |
| 2019/0337472 A1 | 11/2019 | Nakai |
| 2020/0021045 A1* | 1/2020 | Sato ...................... H01R 4/023 |
| 2020/0244025 A1 | 7/2020 | Winey et al. |

FOREIGN PATENT DOCUMENTS

| | | |
|---|---|---|
| CN | 1127783 C | 11/2003 |
| CN | 101164204 A | 4/2008 |
| CN | 101312275 A | 11/2008 |
| CN | 101752700 A | 6/2010 |
| CN | 201562814 U | 8/2010 |
| CN | 101841107 A | 9/2010 |
| CN | 201781115 U | 3/2011 |

(56) References Cited

FOREIGN PATENT DOCUMENTS

| | | |
|---|---|---|
| CN | 102598430 A | 7/2012 |
| CN | 202678544 U | 1/2013 |
| CN | 103178408 A | 6/2013 |
| CN | 104011937 A | 8/2014 |
| CN | 105390857 A | 3/2016 |
| CN | 105406286 A | 3/2016 |
| CN | 106104933 A | 11/2016 |
| CN | 201480017853.4 | 2/2017 |
| CN | 201580069567.7 | 6/2019 |
| CN | 201780046854.5 | 11/2019 |
| DE | 3447556 A1 | 7/1986 |
| EP | 0 997 756 A2 | 5/2000 |
| EP | 1 207 587 A2 | 5/2002 |
| EP | 1 779 472 A1 | 5/2007 |
| EP | 2 169 770 A2 | 3/2010 |
| EP | 11166820.8 | 1/2012 |
| EP | 14773438.8 | 10/2016 |
| EP | 14855318.3 | 4/2017 |
| GB | 1272347 A | 4/1972 |
| JP | 02-079571 U | 6/1990 |
| JP | 7302649 A2 | 11/1995 |
| JP | 2000-311749 A | 11/2000 |
| JP | 2003-109708 A | 4/2003 |
| JP | 2003-208928 A | 7/2003 |
| JP | 2004-031257 A | 1/2004 |
| JP | 2004-071404 A | 3/2004 |
| JP | 2006-108115 A2 | 4/2006 |
| JP | 2006-260850 A | 9/2006 |
| JP | 2010-153191 A | 7/2010 |
| JP | 2010-211937 A | 9/2010 |
| JP | 2010-266729 A | 11/2010 |
| JP | 2011-018651 A | 1/2011 |
| JP | 2012-516021 A | 7/2012 |
| JP | 2013-021600 A | 1/2013 |
| JP | 2014-229597 A | 12/2014 |
| JP | 2016-528688 A | 9/2016 |
| KR | 10-1989-0007458 A | 6/1989 |
| KR | 10-2015-0067010 A | 6/2015 |
| KR | 10-2015-0101020 A | 9/2015 |
| KR | 10-2016-0038192 A | 4/2016 |
| TW | M357771 U | 5/2009 |
| TW | M441942 U1 | 11/2012 |
| TW | 201334318 A | 8/2013 |
| WO | WO 88/05218 A1 | 7/1988 |
| WO | WO 97/12428 A1 | 4/1997 |
| WO | WO 99/56352 A2 | 11/1999 |
| WO | WO 2004/059794 A2 | 7/2004 |
| WO | WO 2004/059801 A1 | 7/2004 |
| WO | PCT/US2005/034605 | 1/2006 |
| WO | WO 2006/002356 A1 | 1/2006 |
| WO | WO 2006/039277 A1 | 4/2006 |
| WO | WO 2007/005597 A2 | 1/2007 |
| WO | WO 2007/005599 A1 | 1/2007 |
| WO | PCT/US2006/025562 | 10/2007 |
| WO | WO 2008/072322 A1 | 6/2008 |
| WO | WO 2008/124057 A1 | 10/2008 |
| WO | WO 2010/039188 A1 | 4/2010 |
| WO | PCT/US2010/056495 | 1/2011 |
| WO | PCT/US2010/056482 | 3/2011 |
| WO | WO 2011/073259 A1 | 6/2011 |
| WO | PCT/US2011/0234747 | 7/2011 |
| WO | PCT/US2011/026139 | 11/2011 |
| WO | WO 2012/078434 A2 | 6/2012 |
| WO | PCT/US2012/023689 | 9/2012 |
| WO | WO 2013/006592 A2 | 1/2013 |
| WO | PCT/US2012/060610 | 3/2013 |
| WO | PCT/US2014/031448 | 7/2014 |
| WO | PCT/US2014/026381 | 8/2014 |
| WO | PCT/US2014/061681 | 1/2015 |
| WO | WO 2015/013430 A1 | 1/2015 |
| WO | PCT/US2015/012542 | 4/2015 |
| WO | PCT/US2015/012463 | 5/2015 |
| WO | WO 2015/112717 A1 | 7/2015 |
| WO | PCT/US2014/026381 | 9/2015 |
| WO | PCT/US2014/031448 | 10/2015 |
| WO | PCT/US2015/060472 | 3/2016 |
| WO | PCT/US2014/061681 | 5/2016 |
| WO | PCT/US2016/043358 | 11/2016 |
| WO | PCT/US2016/065271 | 3/2017 |
| WO | PCT/US2015/060472 | 5/2017 |
| WO | PCT/US2017/033122 | 8/2017 |
| WO | PCT/US2017/035178 | 8/2017 |
| WO | PCT/US2017/057402 | 1/2018 |
| WO | PCT/US2016/065271 | 6/2018 |
| WO | PCT/US2017/033122 | 11/2018 |
| WO | PCT/US2018/039919 | 11/2018 |
| WO | PCT/US2018/045201 | 11/2018 |
| WO | PCT/US2018/045207 | 11/2018 |
| WO | PCT/US2017/035178 | 12/2018 |
| WO | PCT/US2017/057402 | 5/2019 |
| WO | PCT/US2018/039919 | 1/2020 |
| WO | PCT/US2018/045201 | 2/2020 |
| WO | PCT/US2018/045207 | 2/2020 |
| WO | PCT/US2020/014799 | 5/2020 |
| WO | PCT/US2020/014826 | 5/2020 |
| WO | PCT/US2020/019019 | 6/2020 |

OTHER PUBLICATIONS

What is the Heat Affected Zone (HAZ)?, https://www.twi-global.com/technical-knowledge/faqs/what-is-the-heat-affected-zone, retrieved Dec. 20, 2021.*
Lehto et al, Characterization of local grain size variation of welded structural steel, https://link.springer.com/content/pdf/10.1007/s40194-016-0318-8.pdf.*
U.S. Appl. No. 16/054,807, filed Aug. 3, 2018, Dunham.
U.S. Appl. No. 16/054,831, filed Aug. 3, 2018, Gailus et al.
U.S. Appl. No. 16/391,013, filed Apr. 22, 2019, Girard.
U.S. Appl. No. 16/750,967, filed Jan. 23, 2020, Zerebilov et al.
U.S. Appl. No. 16/751,013, filed Jan. 23, 2020, Winey et al.
International Search Report and Written Opinion for International Application No. PCT/US2010/056482 dated Mar. 14, 2011.
International Search Report and Written Opinion for International Application No. PCT/US2010/056495 dated Jan. 25, 2011.
International Search Report and Written Opinion for International Application No. PCT/US2011/026139 dated Nov. 22, 2011.
International Search Report and Written Opinion for International Application No. PCT/US2012/023689 dated Sep. 12, 2012.
International Search Report and Written Opinion for International Application No. PCT/US2012/060610 dated Mar. 29, 2013.
International Search Report and Written Opinion for International Application No. PCT/US2014/026381 dated Aug. 12, 2014.
International Preliminary Report on Patentability for International Application No. PCT/US2014/026381 dated Sep. 24, 2015.
International Search Report and Written Opinion for International Application No. PCT/US2015/012463 dated May 13, 2015.
Chinese Office Action for Application No. CN201580069567.7 dated Jun. 17, 2019.
International Preliminary Report on Patentability for International Application No. PCT/US2015/060472 dated May 26, 2017.
International Search Report and Written Opinion for International Application No. PCT/US2015/060472 dated Mar. 11, 2016.
International Search Report and Written Opinion for International Application No. PCT/US2015/012542 dated Apr. 30, 2015.
International Search Report and Written Opinion for International Application No. PCT/US2016/043358 dated Nov. 3, 2016.
Chinese communication in connection with Chinese Application No. 201780046854.5 dated Nov. 28, 2019.
International Search Report and Written Opinion for International Application No. PCT/US2017/035178 dated Aug. 18, 2017.
International Preliminary Report on Patentability for International Application No. PCT/US2017/035178 dated Dec. 13, 2018.
International Search Report and Written Opinion for International Application No. PCT/US2017/033122 dated Aug. 8, 2017.
International Preliminary Report on Patentability for International Application No. PCT/US2017/033122 dated Nov. 29, 2018.
International Search Report and Written Opinion for International Application No. PCT/US2017/057402 dated Jan. 19, 2018.

(56) References Cited

OTHER PUBLICATIONS

International Preliminary Report on Patentability for International Application No. PCT/US2017/057402 dated May 2, 2019.
International Search Report and Written Opinion for International Application No. PCT/US2018/045207 dated Nov. 29, 2018.
International Preliminary Report on Patentability for International Application No. PCT/US2018/045207 dated Feb. 13, 2020.
International Search Report and Written Opinion for International Application No. PCT/US2018/039919, dated Nov. 8, 2018.
International Preliminary Report on Patentability for International Application No. PCT/US2018/039919, dated Jan. 16, 2020.
International Search Report and Written Opinion for International Application No. PCT/US2018/045201 dated Nov. 26, 2018.
International Preliminary Report on Patentability for International Application No. PCT/US2018/045201 dated Feb. 13, 2020.
International Search Report and Written Opinion dated Jun. 24, 2020 in connection with International Application No. PCT/US2020/019019.
Chinese Office Action for Chinese Application No. 201480017853.4 dated Feb. 4, 2017.
Extended European Search for European Application No. 14773438.8 dated Oct. 12, 2016.
International Search Report and Written Opinion for International Application No. PCT/US2014/031448 dated Jul. 10, 2014.
International Preliminary Report on Patentability for International Application No. PCT/US2014/031448 dated Oct. 8, 2015.
Extended European Search Report for European Application No. 14855318.3 dated Apr. 21, 2017.
International Search Report and Written Opinion for International Application No. PCT/US2014/061681 dated Jan. 27, 2015.
International Preliminary Report on Patentability for International Application No. PCT/US2014/061681 dated May 6, 2016.
International Search Report and Written Opinion for International Application No. PCT/US2016/065271 dated Mar. 24, 2017.
International Preliminary Report on Patentability for International Application No. PCT/US2016/065271 dated Jun. 21, 2018.
International Search Report and Written Opinion for International Application No. PCT/US2020/014799, dated May 27, 2020.
International Search Report and Written Opinion for International Application No. PCT/US2020/014826, dated May 27, 2020.
Extended European Search Report for European Application No. EP 11166820.8 dated Jan. 24, 2012.
International Search Report and Written Opinion for International Application No. PCT/US2005/034605 dated Jan. 26, 2006.
International Search Report and Written Opinion for International Application No. PCT/US2006/25562 dated Oct. 31, 2007.
International Search Report and Written Opinion for International Application No. PCT/US2011/034747 dated Jul. 28, 2011.
[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.
[No Author Listed], Agilent. Designing Scalable 10G Backplane Interconnect Systems Utilizing Advanced Verification Methodologies. White Paper, Published May 5, 2012. 24 pages.
[No Author Listed], Carbon Nanotubes for Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013. 2 pages.
[No Author Listed], File:Wrt54gl-layout.jpg Sep. 8, 2006. Retrieved from the Internet: https://xinu.mscs.mu.edu/File:Wrt54gl-layout.jpg [retrieved on Apr. 9, 2019]. 2 pages.
[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].
[No Author Listed], Size 8 High Speed Quadrax and Differential Twinax Contacts for Use in MIL-DTL-38999 Special Subminiature Cylindrical and ARINC 600 Rectangular Connectors. Published May 2008. 10 pages. Retrieved from https://www.peigenesis.com/images/content/news/amphenol_quadrax.pdf.
Beaman, High Performance Mainframe Computer Cables. 1997 Electronic Components and Technology Conference. 1997;911-7.
Fjelstad, Flexible Circuit Technology. Third Edition. BR Publishing, Inc. Sep. 2006. 226 pages. ISBN 0-9667075-0-8.
Shi et al., Improving Signal Integrity in Circuit Boards by Incorporating Absorbing Materials. 2001 Proceedings. 51st Electronic Components and Technology Conference, Orlando FL. 2001:1451-56.
Lloyd et al., High Speed Bypass Cable Assembly, U.S. Appl. No. 15/715,939, filed Sep. 26, 2017.
Lloyd et al., High Speed Bypass Cable Assembly, U.S. Appl. No. 15/271,903, filed Sep. 21, 2016.
Montemayor, Electrically Conductive Silicone Adhesive. Dow Corning Corp. SMTA International Conference, Sep. 2002. 7 pages.
Zerebilov et al., I/O Connector Configured for Cable Connection to a Midboard, U.S. Appl. No. 16/750,967, filed Jan. 23, 2020.

\* cited by examiner

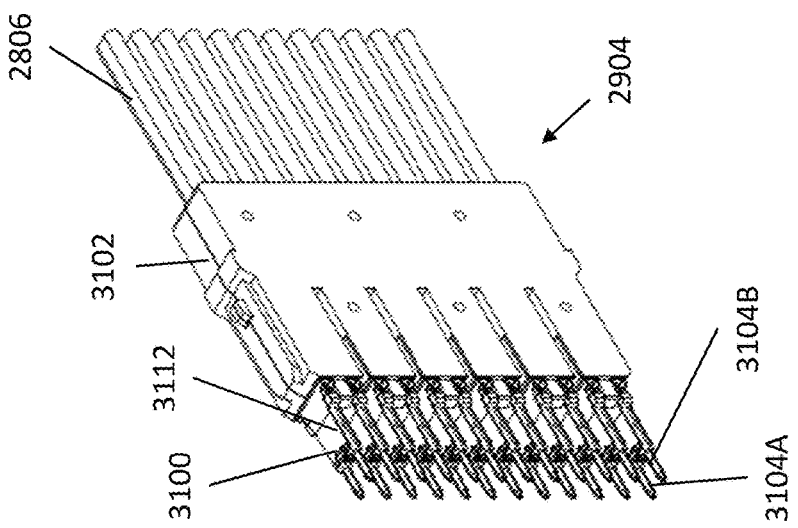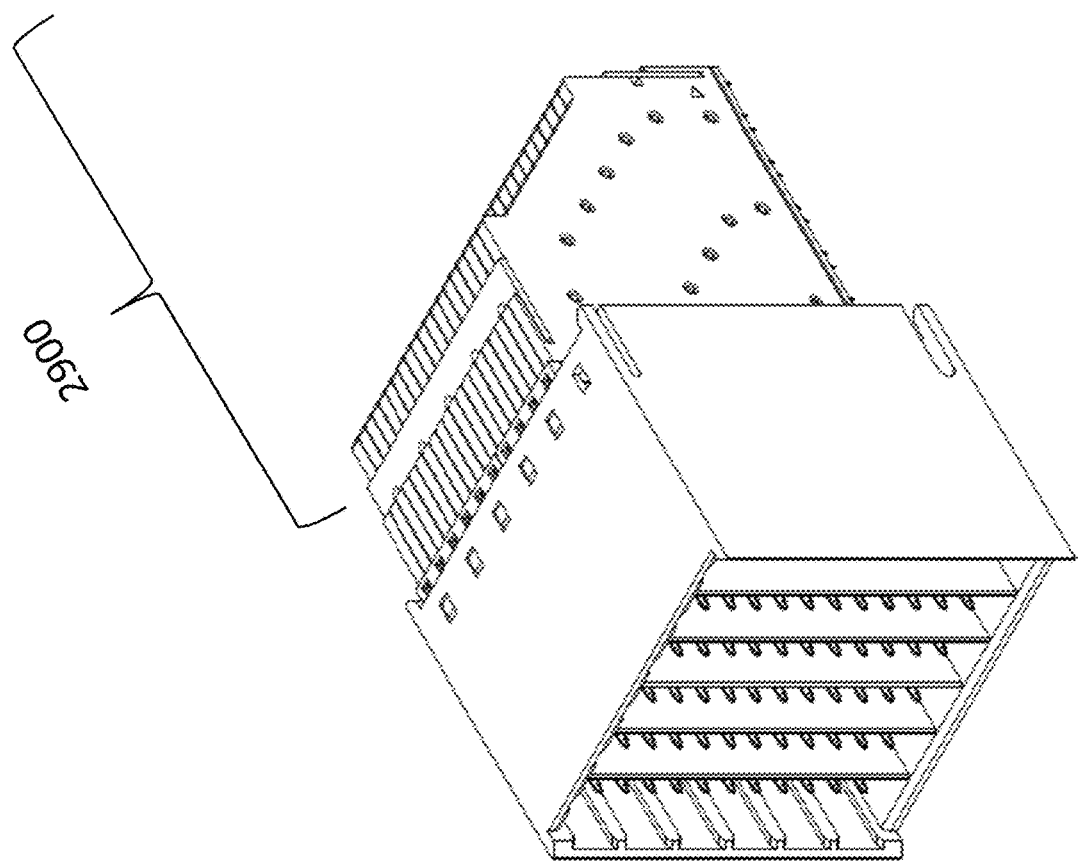
FIG. 3B

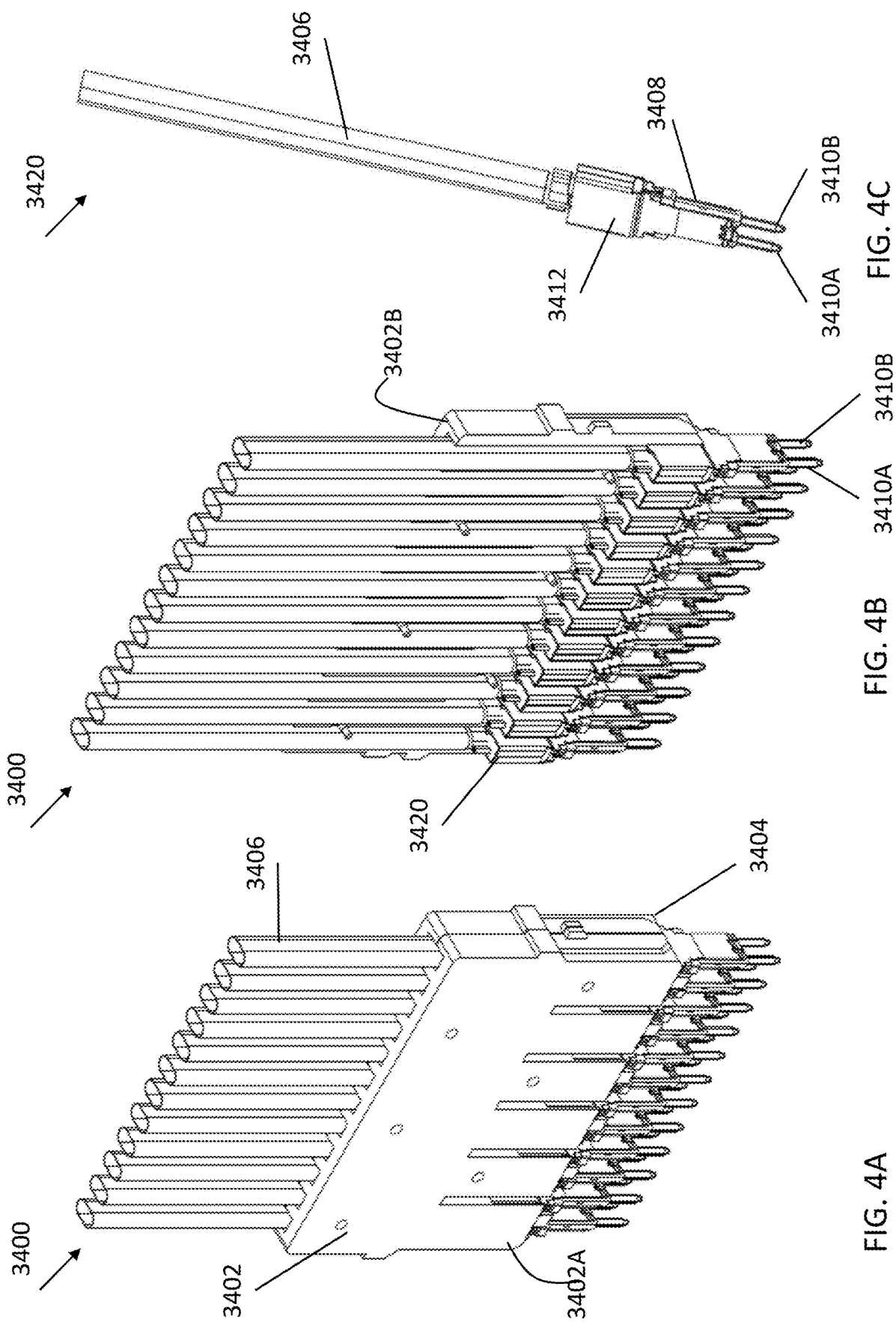

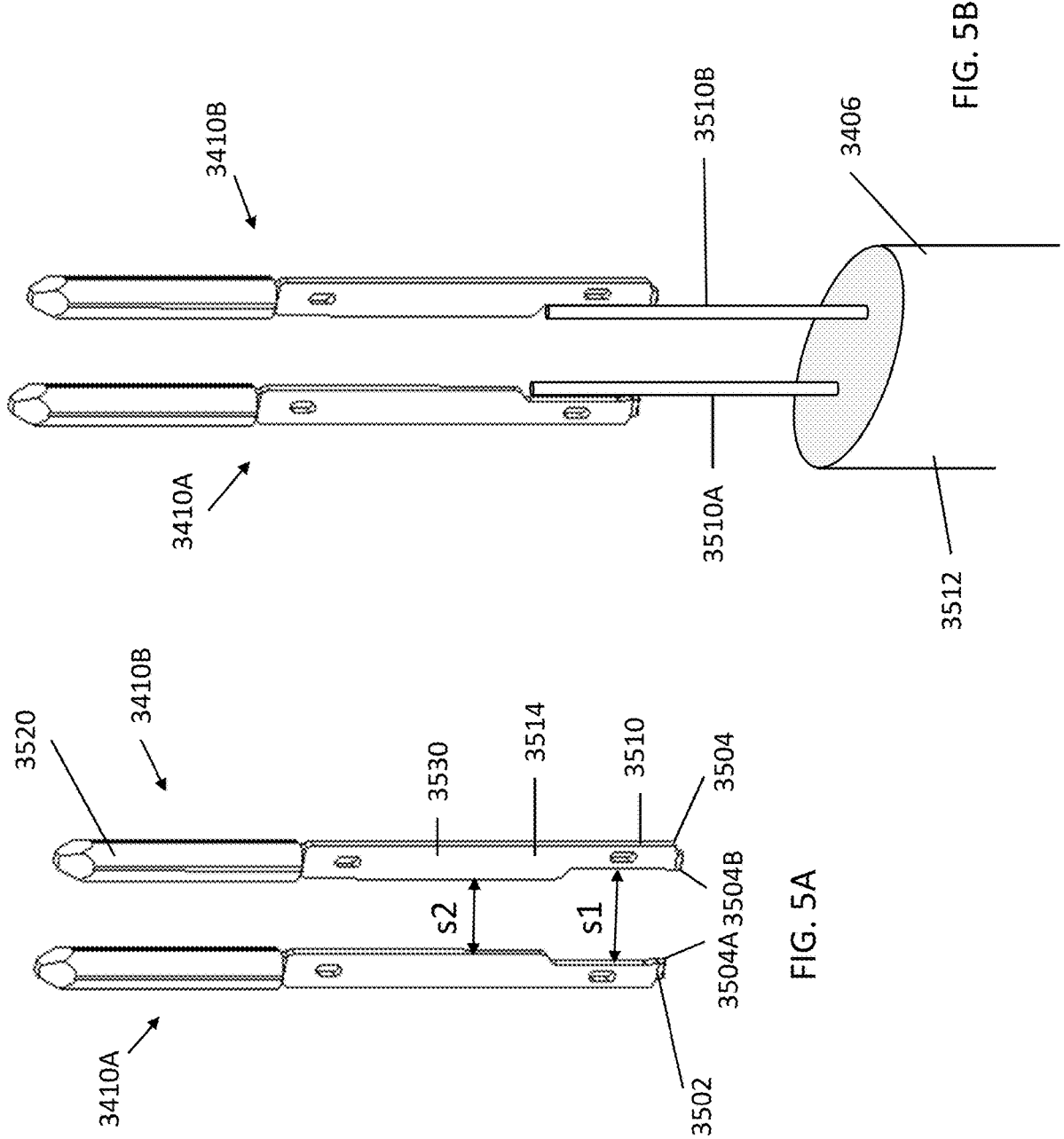

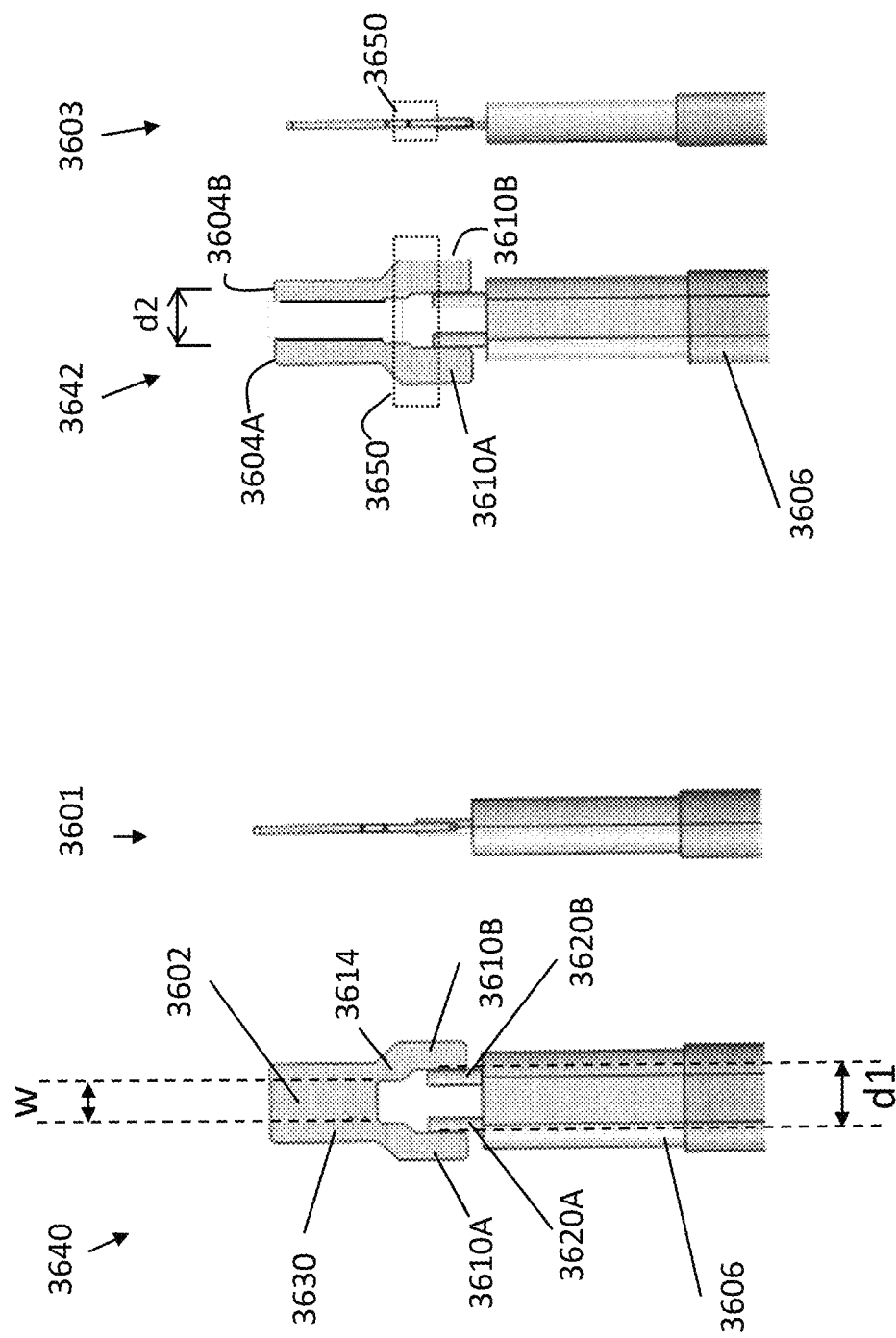

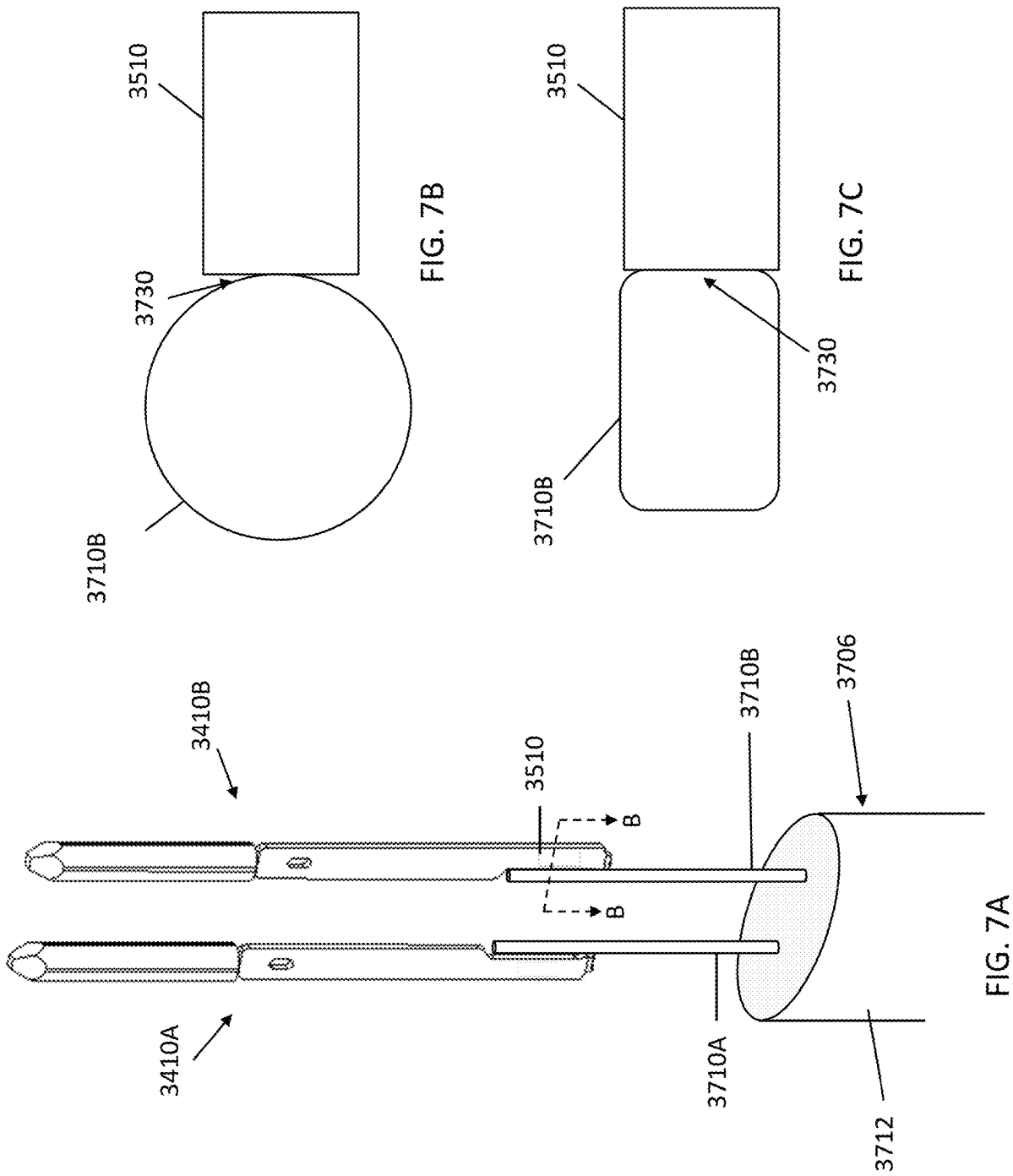

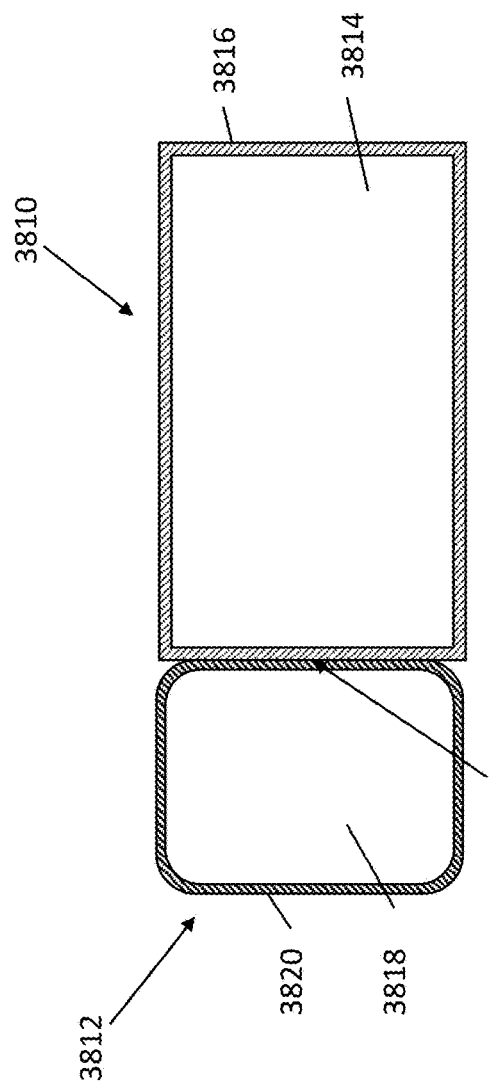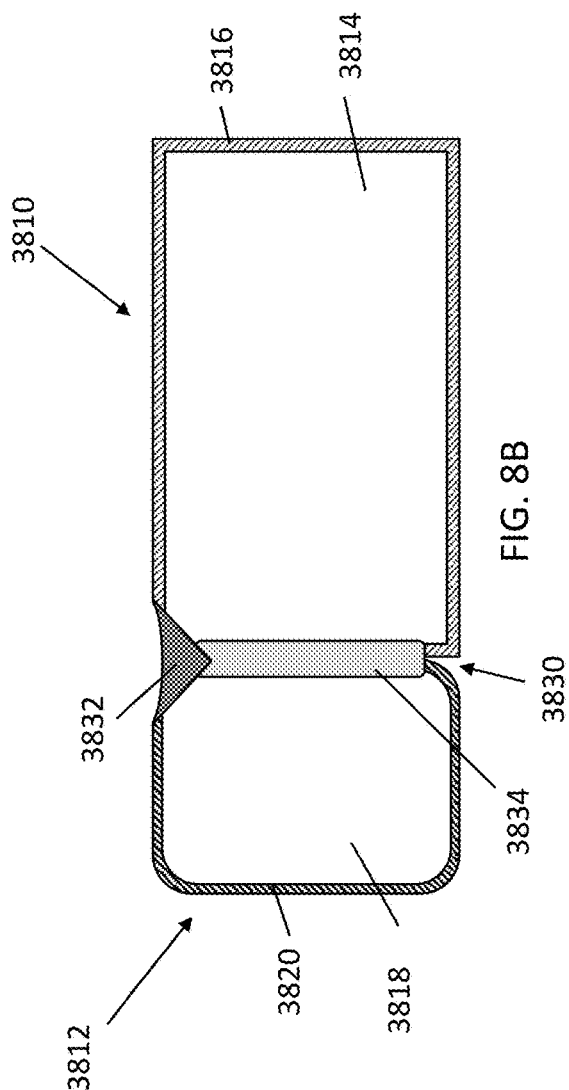

HIGH PERFORMANCE CABLE CONNECTOR ASSEMBLY

CROSS-REFERENCE TO RELATED APPLICATIONS

This application claims the benefit under 35 U.S.C. § 119(e) of U.S. Provisional Patent Application Ser. No. 62/809,381, filed on Feb. 22, 2019, entitled "HIGH PERFORMANCE CABLE CONNECTOR ASSEMBLY," which is hereby incorporated herein by reference in its entirety.

BACKGROUND

This patent application relates generally to interconnection systems, such as those including cables and electrical connectors.

Cables are used in many electronic systems. Electronic systems are assembled from multiple components that are interconnected. Often, components are mounted to printed circuit boards (PCBs), which provide both mechanical support for the components and conductive structures that deliver power to the components and provide signal paths between components attached to the PCB.

Sometimes PCBs are joined together with electrical connectors. The connectors provide a separable interface such that the PCBs in a system can be manufactured at different times or in different locations, yet simply assembled into a system. A known arrangement for joining several printed circuit boards is to have one printed circuit board serve as a backplane. Other printed circuit boards, called "daughterboards" or "daughtercards," may be connected through the backplane.

A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane.

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

In some scenarios, components may be separated by a longer distance than can be connected via traces in a PCB. Cables may be used to route signals between components because cables can be routed through curving paths where it would be difficult to install a rigid PCB or can be manufactured with less signal loss per inch than a PCB.

Cables provide signal paths with high signal integrity, particularly for high frequency signals, such as those above 40 Gbps using an NRZ protocol. Each cable has one or more signal conductors, which is surrounded by a dielectric material, which in turn is surrounded by a conductive layer. A protective jacket, often made of plastic, may surround these components. Additionally the jacket or other portions of the cable may include fibers or other structures for mechanical support.

One type of cable, referred to as a "twinax cable," is constructed to support transmission of a differential signal and has a balanced pair of signal wires, is embedded in a dielectric, and encircled by a conductive layer. The conductive layer is usually formed using foil, such as aluminized Mylar. The twinax cable can also have a drain wire. Unlike a signal wire, which is generally surrounded by a dielectric, the drain wire may be uncoated so that it contacts the conductive layer at multiple points over the length of the cable.

Cables may be terminated with connectors, forming a cable assembly. The connectors may plug into mating connectors that are in turn connected to the components to be connected. At an end of the cable, where the cable is to be terminated to a connector or other terminating structure, the protective jacket, dielectric and the foil may be removed, leaving portions of the signal wires and the drain wire exposed at the end of the cable. These wires may be attached to a connector or other terminating structure. The signal wires may be attached to conductive elements serving as mating contacts in the connector. The drain wire may be attached to a ground conductor in the terminating structure. In this way, any ground return path may be continued from the cable to the terminating structure.

To receive the connector of a cable assembly, a connector, called an "I/O connector" may be mounted to a PCB, usually at an edge of the PCB. That connector may be configured to receive a plug at one end of a cable assembly, such that the cable is connected to the PCB through the I/O connector. The other end of the cable assembly may be connected to another electronic device.

Cables have also been used to make connections within the same electronic device. For example, cables have been used to route signals from an I/O connector to a processor assembly that is located at the interior of the PCB, away from the edge at which the I/O connector is mounted. In other configurations, both ends of a cable may be connected to the same PCB. The cables can be used to carry signals between components mounted to the PCB near where each end of the cable connects to the PCB.

SUMMARY

Aspects described herein relate to low loss interconnection systems.

In one aspect, some embodiments may relate to a connector assembly comprising a first signal conductor having a first contact tail and a first wire extending from a cable. The first contact tail includes an edge having a first planar surface, and a portion of the first wire is at least partially flattened to form a second planar surface. The first wire is attached to the edge of the first contact tail with the second planar surface of the first wire in contact with the first planar surface of the first contact tail.

In another aspect, some embodiments may relate to a connector assembly comprising a signal conductor having a contact tail, the contact tail comprising an edge, and wire extending from a cable and attached to the edge of the contact tail via a bond extending along an attachment interface. At least a portion of the bond is a metallurgical bond.

In a further aspect, some embodiments may relate to a method of forming an electrical connector. The method comprises bonding a wire of a cable to an edge of contact tail of a signal conductor along an attachment interface, at least in part, by melting a first material, flowing the first material into the attachment interface, and interdiffusing at least a portion of the first material and a second material across the attachment interface to form a metallurgical bond.

In yet another aspect, some embodiments may relate to a method of forming an electrical connector comprising deforming a portion of a first wire of a cable to form a first planar surface. The method further comprises attaching the first wire to an edge of a first contact tail of a first signal conductor, at least in part, by contacting the first planar surface of the first wire to a second planar surface of the edge of the first contact tail.

The foregoing is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A-3C are isometric views, partially exploded, of the connector of FIG. 2A, according to some embodiments;

FIG. 4A is an isometric view of a cable assembly, according to some embodiments;

FIG. 4B is an isometric view, partially cutaway, of the cable assembly in FIG. 4A, according to some embodiments;

FIG. 4C is an isometric view of a cable assembly module, which can be used to form the cable assembly in FIG. 4A, according to some embodiments;

FIG. 5A is an isometric view of a pair of signal conductors, according to some embodiments;

FIG. 5B is an isometric view of a cable attached to the pair of signal conductors of FIG. 5A, according to some embodiments;

FIG. 6A is a plan view of a mounting interface between a pair of signal conductors and a cable, according to some embodiments;

FIG. 6B is an elevation view of the mounting interface between the pair of signal conductors and the cable of FIG. 6A, according to some embodiments;

FIG. 6C is a plan view of a mounting interface between a pair of signal conductors and a cable, according to some embodiments;

FIG. 6D is an elevation view of the mounting interface between the pair of signal conductors and the cable of FIG. 6C, according to some embodiments;

FIG. 7A is an isometric view of a cable attached to a pair of signal conductors, according to some embodiments;

FIG. 7B is a cross-sectional view taken along line B-B of FIG. 7A;

FIG. 7C shows the cross-sectional view of FIG. 7B after deforming a signal conductor, according to some embodiments;

FIG. 8A is a cross-sectional view of an attachment interface between a signal conductor and a contact tail, according to some embodiments;

FIG. 8B shows the attachment interface of FIG. 8A after forming a metallurgical bond, according to some embodiments;

DETAILED DESCRIPTION

Figure 1:
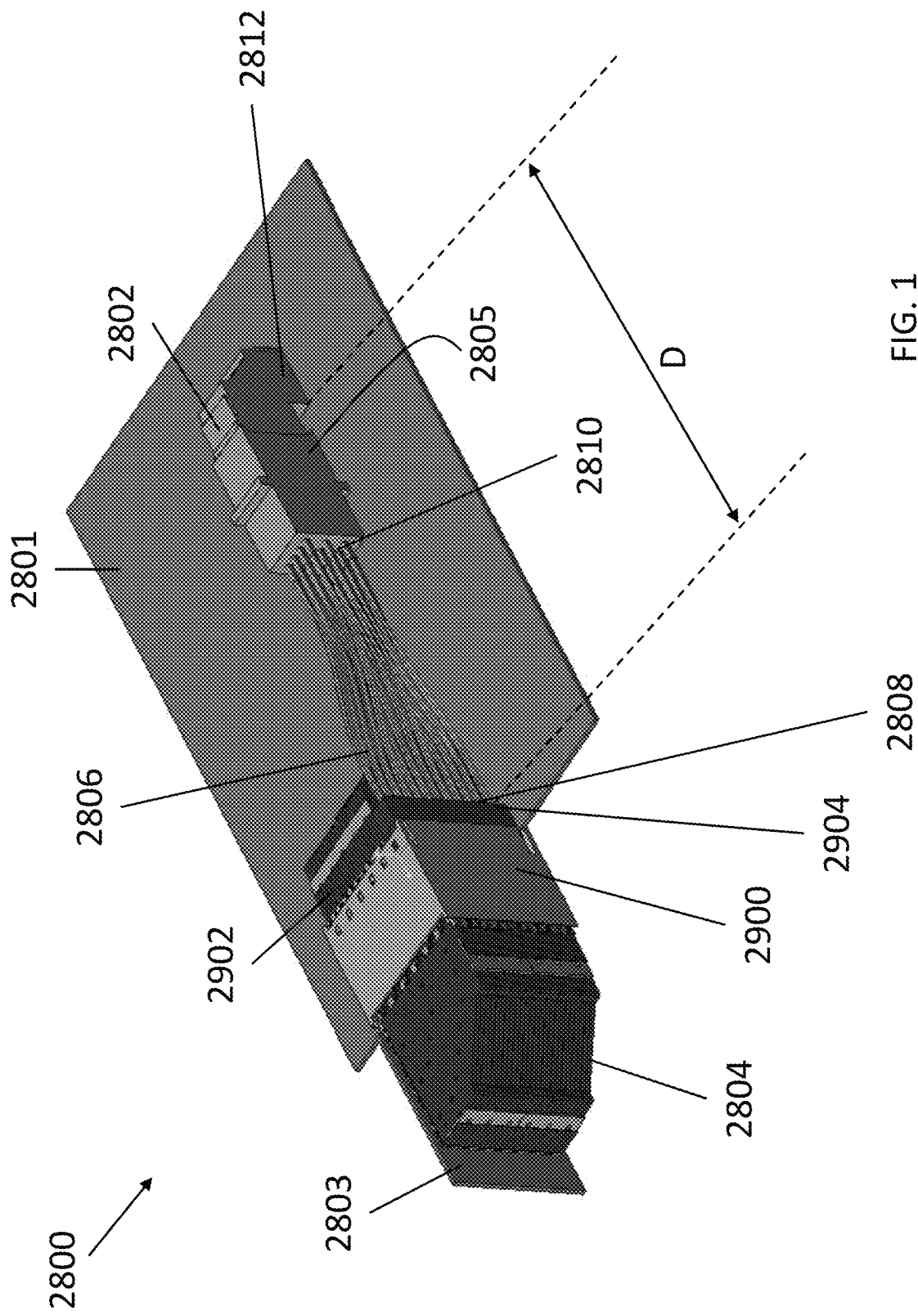
FIG. 1 is an isometric view of an illustrative electrical interconnection system, according to some embodiments.

The inventors have recognized and appreciated techniques for improving the performance of an electronic system through the use of low loss interconnects, particularly for high frequency signals that are enabled by the manner in which cables are attached to conductive elements in connectors or other terminating structures. In some embodiments, a pair of signal conductors of a cable (e.g., wires in the cable) may be reliably attached at opposed edges of conductive elements of a connector configured to carry a differential pair signal. With such an arrangement, changes of geometry at the cable attachment interface, which might otherwise cause changes of impedance that could impact signal integrity, may be reduced. Alternatively or additionally, such an attachment interface may reduce the amount of metal at the attachment interface, reducing the change of inductance relative to a convention design in which a cable is soldered on a broadside of a signal conductor, which also reduces changes of impedance.

The inventors have recognized and appreciated techniques that enable robust attachment of wires at an edge of conductive element. One such technique may include adjusting a shape of at least a portion of a signal conductor of a cable prior to attaching the signal conductor to a conductive element of a connector, such as a contact tail. In particular, the inventors have recognized that the typical round shape of a wire in a cable may result in a limited contact area between the wire and the conductive element of the connector, which may lead to poor quality attachment of the wire to the connector and/or undesirable impedance changes at the attachment interface as a result of the mass of material required to form a suitable attachment.

According to some aspects described herein, a wire may be deformed prior to joining with an associated conductive element of a connector such that at least a portion of the wire is at least partially flattened. The flattened portion of the wire may form a planar surface that may be placed into contact with a corresponding planar surface of the conductive element of the connector, and the wire and conductive element may subsequently be joined to attach the wire to the connector. In some embodiments, an area of the flattened portion of the wire (i.e., the planar surface of the wire) may substantially match a corresponding contact area on the conductive element of the connector (i.e., the planar surface of the conductive element), which may aid in avoiding changes in impedance through the attachment interface. For example, the wire may initially have a diameter that is larger than a thickness of the conductive element of the connector, and after flattening, the thickness of the flattened portion of the wire may substantially match the thickness of the conductive element. In some embodiments, the wire may be pressed against the contact area on the conductive element during attachment to achieve the above-described deformation of the wire. However, it should be understood that the wire may be deformed or flattened in any suitable manner, such as by flattening the wire with appropriate tooling, as the current disclosure is not limited in this regard.

Another such technique may involve forming an attachment interface and physically bonding and/or joining a wire of a cable to a conductive portion of a connector (e.g., a contact tail) with a small volume of conductive material. As noted above, changes of geometry at the cable attachment interface may lead to undesirable changes of impedance that may impact signal integrity. Accordingly, techniques described herein may reduce or eliminate such changes in geometry, for example, by forming a bond at the attachment interface without requiring solder or other material to be added to the attachment interface that may cause such geometry changes. In some embodiments, the wires of a cable and contact tails of a connector may comprise materials selected to provide desired material properties (e.g., thermodynamic and/or kinetic properties), which may facilitate joining of the wire to the conductive portion without the need for solder or other joining material. For example, the materials may be selected to form a metallurgical bond along at least a portion of the attachment interface upon heating of the attachment interface. As described in more detail below, in some instances, the heating required to form the metallurgical bond may be less than may be required for other conventional joining techniques, such as welding. Moreover, the inventors have recognized and appreciated that such lower heating requirements to form a bond may, in some instances, avoid undesirable loss of material at the attachment interface that may occur due to ablation or other effects associated with higher power joining operations, such as high power laser welding.

Figure 9B:
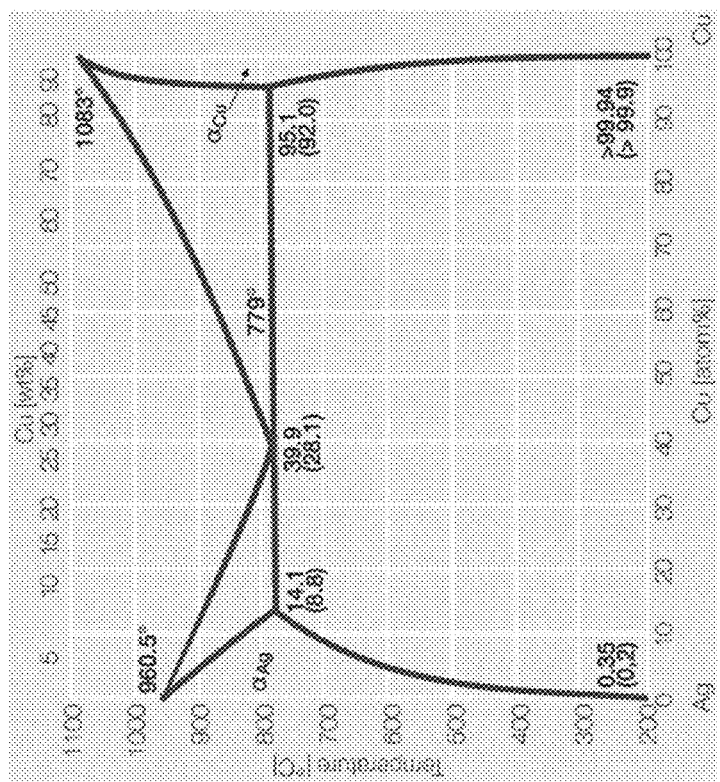
FIG. 9B shows a copper-silver phase diagram, and illustrates an example of a eutectic material system, according to some embodiments.
Figure 9A:
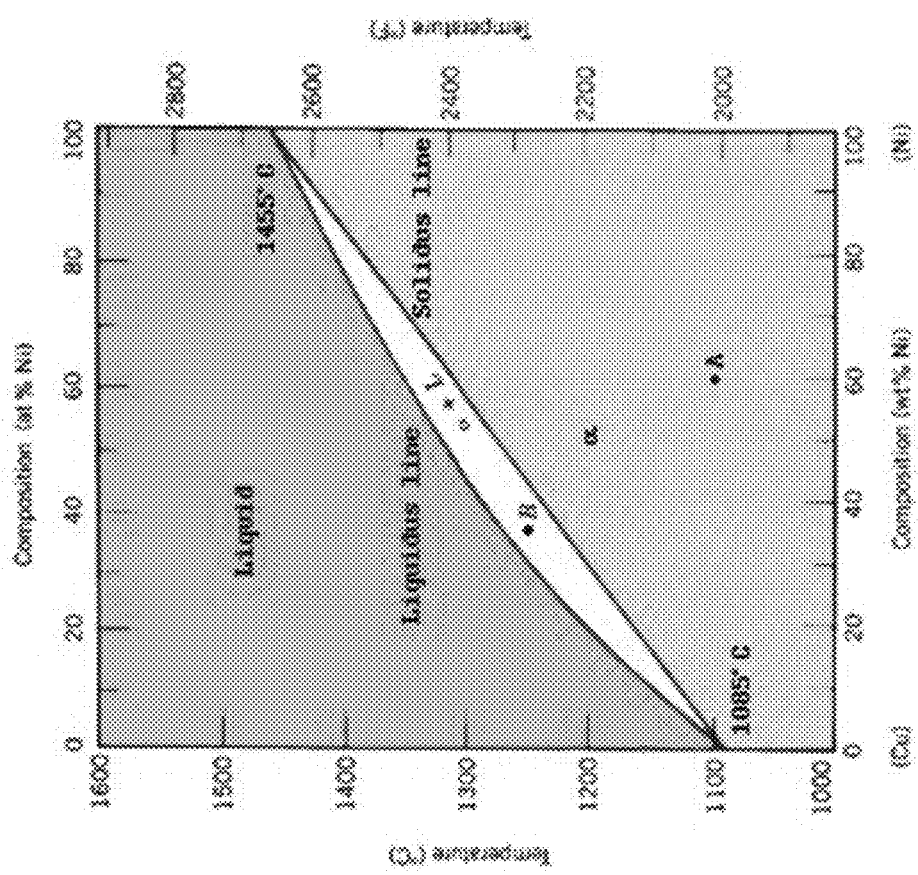
FIG. 9A shows a copper-nickel phase diagram, and illustrates an example of a material system exhibiting soluble behavior, according to some embodiments.

In some embodiments, at least a portion of the wires of a cable and/or the contact tails of a connector may comprise a coating selected to provide the above-described material properties, which may facilitate joining of the wires to the contact tails. For example, such coatings may be selected such that the coating material is soluble in a base alloy of the wire and/or contact tail, to promote interdiffusion of the materials of the wire and/or the contact tail, and/or to facilitate melting and flow of material into the attachment interface between the wire and the contact tail at lower temperatures. As used herein, a first material being soluble within a second material refers a two (or more) component material system in which the two (or more) materials form a single phase mixture at equilibrium conditions when the two (or more) materials are combined. For example, materials that are fully soluble in one another (e.g., copper and nickel; see FIG. 9A) form a single phase solid solution at temperatures below the melting point of the lower melting point material, and a single phase liquid solution at higher temperatures (i.e., above the melting point of the higher melting point material. At intermediate temperatures between the melting temperatures of the two materials, the materials form a two phase mixture comprising a liquid phase and a solid phase. Other material systems may be partially soluble, such that two or more materials of the material system exhibit soluble behavior and over one or more limited ranges of compositions.

Additionally, in some embodiments, a coating material and a base alloy may be selected such that the coating material and base alloy form a eutectic material system in which a mixture of the coating material and the base alloy melts at a lower temperature than the melting temperatures of the coating material and the base alloy. In some such eutectic systems, the coating material and base alloy may form three distinct phases: a liquid (at high temperatures) in which the coating material and base alloy are miscible in one another, a first solid phase in which the coating material may exhibit limited solubility in the base alloy, and a second solid phase in which the base alloy may exhibit some solubility in the coating material. Each of the solid phases may be a solid solution exhibiting the crystal structure of the primary component. One exemplary material system that exhibits such eutectic behavior is the silver-copper material system (see FIG. 9B). In that material system, addition of silver to pure copper results in a mixture having a lower melting point compared to the melting point of pure copper. This reduction in the melting point continues with increased addition of silver until the mixture reaches the eutectic composition of approximately 39.9 atomic percent copper and 60.1 atomic percent silver; at the eutectic composition, the system exhibits its lowest possible melting temperature. Further addition of silver results in an increase in the melting temperature, up to the melting temperature of pure silver at 0 atomic percent copper. While the above-described example exhibits eutectic behavior over the entire composition range of the mixture, other systems in which eutectic behavior occurs over a limited range of composition also may be suitable. Moreover, while the above described eutectic material system includes two pure metal elements, other eutectic systems may be suitable, such as systems in which one or more component comprises a metal alloy, intermetallic compound, oxide, ceramic, or other suitable compound.

In some applications, the coating materials on the wires of the cable and the contact tails may be different and may provide different thermodynamic effects. For example, in one embodiment, the wires and contact tails may comprise similar or identical base alloys, but may have different coating materials. For instance, a first coating on the wires of the cable may be selected to form a eutectic alloy system (as described above) such that the addition of the first coating material to the base alloy effectively lowers the melting point of the base alloy of the wire; a second coating on the contact tails of the connector may be selected such that the coating material is partially or fully soluble with the base alloy of the connector such that the second coating material and the base alloy form a single phase solid or liquid over suitable composition ranges. As described in more detail below, such a configuration may allow for flow of material into an attachment interface and subsequent interdiffusion of the coating and base alloy materials to form a metallurgical bond along at least a portion of the attachment interface. While a particular configuration of first and second coatings is described above, it should be understood that other configurations may be suitable. For instance, in other embodiments, a first coating on the wires may be selected to be partially or fully soluble with the base alloy of the wire, and the second coating on the contact tails may be selected to form a eutectic system. In further embodiments, the first and second coatings may be selected to provide the same or similar type of thermodynamic response, such as forming a soluble mixture or a eutectic system.

Cable termination techniques as described herein may be used to terminate cables of any suitable type to conductive structures of any suitable type. Termination of a twinax cable to signal conductors of a connector is described as an example of a cable termination herein. Each signal conductor may include a contact tail, a mating contact portion, and an intermediate portion that extends between the contact tail and the mating contact portion. In some embodiments, the connector assembly may further include a plurality of cables. Each cable may include one or more wires. Each wire may be attached to a contact tail of a signal conductor of a connector using the above-described attachment and/or joining techniques.

In some embodiments, each of the pair of signal conductors of a connector may include broadsides and edges joining the broadsides. The pair of signal conductors may be formed by stamping a metal piece, with one or more tie bars connecting two opposing edges of the pair such that the separation between the pair is controlled by the size of the tie bar. The size of the tie bar may be selected based on the size of a wire in a cable to be attached, e.g., AWG 28, AWG 30, etc. The tie bar may set a spacing between opposing edges of the contact tails of the signal conductors such that, when the wire is attached to each edge, the separation between the wires yields a desired impedance, such as an impedance matching that of the cable or other parts of the interconnect.

Either before or after the wires are attached to the signal conductors, a housing may be molded around the pair of signal conductors such that the contact tails of the pair of signal conductors may be held in the housing in an edge-to-edge configuration. The tie bar then may be severed in order to isolate the pair of signal conductors. Compared with the conventional method of terminating cable wires on surfaces thus forming large bumps, attaching the cable wires to the edges allows for more precise control over the spacing between cable wires and reduces impedance mismatch. Impedance control may also be provided by an attachment that has a small impact on inductance at the conductor to wire interface, such as via the above-described attachment and/or joining techniques.

The foregoing principles are illustrated with an example, such as the interconnection system shown in FIG. 1. FIG. 1 illustrates an electrical interconnection system of the form that may be used in an electronic system. In this example, an orthogonal configuration, creates signal paths to a printed circuit board through a connector attached to an edge of a board. That connector is attached to the board at a footprint. Traces "breakout" of that footprint and are routed to other points on the board where they connect to other components. In this way, signals may be routed through a connector to a component anywhere on the board. However, in some scenarios, the board will be large enough that the distance between the connector and the component that receives a signal is long, such as greater than six inches. These long traces may undesirably degrade a signal carried on such a trace. FIG. 1 illustrates a configuration in which long traces are avoided, by facilitating integration of cables to carry signal over long distances.

FIG. 1 illustrates an electrical interconnection system 2800 including connectors 2802, 2804, 2900, cables 2806, and printed circuit boards (PCBs) 2801, 2803. Connector 2900 may include first type connector units 2902 and second type connector units 2904. The first type connector units may be directly mounted to PCB 2801. The second type connector units may be coupled to PCB 2801 through cables 2806. In the embodiment illustrated, cables 2806 connect to connector 2802, which in turn makes connections to PCB 2801.

In the illustrated example, connector 2900 includes both signal conductors configured to attach to a cable and to attach to a printed circuit board. Connector 2900 may be assembled from connector units that are configured for each type of attachment, such that there is a first type of connector units that have signal conductors configured to attach to a printed circuit board and a second type of connector units that have signal conductors configured to attach to a cable. However, the present invention is not limited in this regard. In some embodiments, cables may be terminated to other types of connectors or to conductors that are part of other types of electronic components.

Connector 2804 may be mounted to PCB 2803 at one end and mate with connector 2900 on the other end such that PCB 2803 is orthogonal to PCB 2801.

Cables 2806 may have first ends 2808 attached to the second type connector units 2904 and second ends 2810 attached to connector 2805. Connector 2805 is here mated to connector 2802, through which signals carried by the cables are coupled to PCB 2801. The second ends of the cables may be coupled to PCB 2801 at a location spaced from the first ends of the cables with a distance D. Any suitable value may be selected for the distance D. In some embodiments, D may be at least 6 inches, in the range of 1 to 20 inches, or any value within the range, such as between 6 and 20 inches. However, the upper limit of the range may depend on the size of PCB 2801, and the distance from connector 2900 that components (not shown) are mounted to PCB 2801, as connector 2802 may be mounted near components that receive or generate signals that pass through cables 2806. As a specific example, connector 2802 may be mounted within 6 inches of those components, and in some embodiments, will be mounted within 4 inches of those components or within 2 inches of those components.

Connector 2900 may be mated to any suitable type of connector. In some embodiments, mating connector 2804 may be an orthogonal connector. In the illustrated embodiments, both connectors 2900 and 2804 may have a modular construction, and similar modules may be used for corresponding components. Connector 2900 may be configured as a direct attach orthogonal connector. That configuration may be achieved by attaching an extender to a connector with a mating interface that is the same as the mating interface described in connection with connector 2804.

As can be seen in FIG. 1, connector 2804 includes contact tails designed to attach to a PCB. These contact tails form one end of conductive elements that pass through the interconnection system. When the connectors are mounted to printed circuit boards, these contact tails will make electrical connection to conductive structures within the printed circuit board that carry signals or are connected to a reference potential. In the example illustrated the contact tails are press fit, "eye of the needle," contacts that are designed to be pressed into vias in a printed circuit board. However, other forms of contact tails may be used.

Each of the connectors also has a mating interface where that connector can mate—or be separated from—the other connector. Connector 2804 includes a mating interface. Though not fully visible in the view shown in FIG. 1, mating contact portions of the conductive elements are exposed at the mating interface.

Each of these conductive elements includes an intermediate portion that connects a contact tail to a mating contact portion. The intermediate portions may be held within a connector housing, at least a portion of which may be dielectric so as to provide electrical isolation between conductive elements. Additionally, the connector housings may include conductive or lossy portions, which in some embodiments may provide conductive or partially conductive paths between some of the conductive elements. In some embodiments, the conductive portions may provide shielding. The lossy portions may also provide shielding in some instances and/or may provide desirable electrical properties within the connectors.

In various embodiments, dielectric members may be molded or over-molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. As a non-limiting example, thermoplastic PPS filled to 30% by volume with glass fiber may be used to form the entire connector housing or dielectric portions of the housings.

Alternatively or additionally, portions of the housings may be formed of conductive materials, such as machined metal or pressed metal powder. In some embodiments, portions of the housing may be formed of metal or other conductive material with dielectric members spacing signal conductors from the conductive portions. For example, a housing of a connector may have regions formed of a conductive material with insulative members separating the intermediate portions of signal conductors from the conductive portions of the housing.

The housing of connector 2804 may also be formed in any suitable way. In the embodiment illustrated, daughtercard connector 2804 may be formed from multiple units, which may be subassemblies, which may include one or more "wafers" and, in some embodiments, one or more extender modules, and one or more support members to hold the components together. Each of the wafers may include a housing portion, which may similarly include dielectric, lossy and/or conductive portions. One or more members may hold the wafers in a desired position. For example, support members may hold top and rear portions, respectively, of multiple wafers in a side-by-side configuration. Support members may be formed of any suitable material, such as a sheet of metal stamped with tabs, openings or other features that engage corresponding features on the individual wafers.

Other members that may form a portion of the connector housing may provide mechanical integrity for daughtercard connector 2804 and/or hold the wafers in a desired position. For example, a front housing portion may receive portions of the wafers forming the mating interface. Any or all of these portions of the connector housing may be dielectric, lossy and/or conductive, to achieve desired electrical properties for the interconnection system.

In some embodiments, each wafer may hold a column of conductive elements forming signal conductors. These signal conductors may be shaped and spaced to form single ended signal conductors. However, in the embodiment illustrated in FIG. 1, the signal conductors are shaped and spaced in pairs to provide differential signal conductors. Each of the columns may include or be bounded by conductive elements serving as ground conductors. It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals.

Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

The spacing between adjacent columns of conductors may be within a range that provides a desirable density and desirable signal integrity. As a non-limiting example, the conductors may be stamped from 0.4 mm thick copper alloy, and the conductors within each column may be spaced apart by 2.25 mm and the columns of conductors may be spaced apart by 2.4 mm. However, a higher density may be achieved by placing the conductors closer together. In other embodiments, for example, smaller dimensions may be used to provide higher density, such as a thickness between 0.2 and 0.4 mm or spacing of 0.7 to 1.85 mm between columns or between conductors within a column. Moreover, each column may include four pairs of signal conductors, such that a density of 60 or more pairs per linear inch is achieved for the interconnection system illustrated in FIG. 1. However, it should be appreciated that more pairs per column, tighter spacing between pairs within the column and/or smaller distances between columns may be used to achieve a higher density connector.

The wafers may be formed in any suitable way. In some embodiments, the wafers may be formed by stamping columns of conductive elements from a sheet of metal and over molding dielectric portions on the intermediate portions of the conductive elements. In other embodiments, wafers may be assembled from modules each of which includes a single, single-ended signal conductor, a single pair of differential signal conductors or any suitable number of single ended or differential pairs.

The inventors have recognized and appreciated that assembling wafers from modules may aid in reducing "skew" in signal pairs at higher frequencies, such as between about 25 GHz and 40 GHz, or higher. Skew, in this context, refers to the difference in electrical propagation time between signals of a pair that operates as a differential signal. Modular construction that reduces skew is designed described, for example in U.S. Pat. Nos. 9,509,101 and 9,450,344, which are incorporated herein by reference.

In accordance with techniques described in those patents incorporated by reference, in some embodiments, connectors may be formed of modules, each carrying a signal pair. The modules may be individually shielded, such as by attaching shield members to the modules and/or inserting the modules into an organizer or other structure that may provide electrical shielding between pairs and/or ground structures around the conductive elements carrying signals.

In some embodiments, signal conductor pairs within each module may be broadside coupled over substantial portions of their lengths. Broadside coupling enables the signal conductors in a pair to have the same physical length. To facilitate routing of signal traces within the connector footprint of a printed circuit board to which a connector is attached and/or constructing of mating interfaces of the connectors, the signal conductors may be aligned with edge to edge coupling in one or both of these regions. As a result, the signal conductors may include transition regions in which coupling changes from edge-to-edge to broadside or vice versa. As described below, these transition regions may be designed to prevent mode conversion or suppress undesired propagation modes that can interfere with signal integrity of the interconnection system.

The modules may be assembled into wafers or other connector structures. In some embodiments, a different module may be formed for each row position at which a pair is to be assembled into a right angle connector. These modules may be made to be used together to build up a connector with as many rows as desired. For example, a module of one shape may be formed for a pair to be positioned at the shortest rows of the connector, sometimes called the a-b rows. A separate module may be formed for conductive elements in the next longest rows, sometimes called the c-d rows. The inner portion of the module with the c-d rows may be designed to conform to the outer portion of the module with the a-b rows.

This pattern may be repeated for any number of pairs. Each module may be shaped to be used with modules that carry pairs for shorter and/or longer rows. To make a connector of any suitable size, a connector manufacturer may assemble into a wafer a number of modules to provide a desired number of pairs in the wafer. In this way, a connector manufacturer may introduce a connector family for a widely used connector size—such as 2 pairs. As customer requirements change, the connector manufacturer may procure tools for each additional pair, or, for modules that contain multiple pairs, group of pairs to produce connectors of larger sizes. The tooling used to produce modules for smaller connectors can be used to produce modules for the shorter rows even of the larger connectors.

Figure 2B:
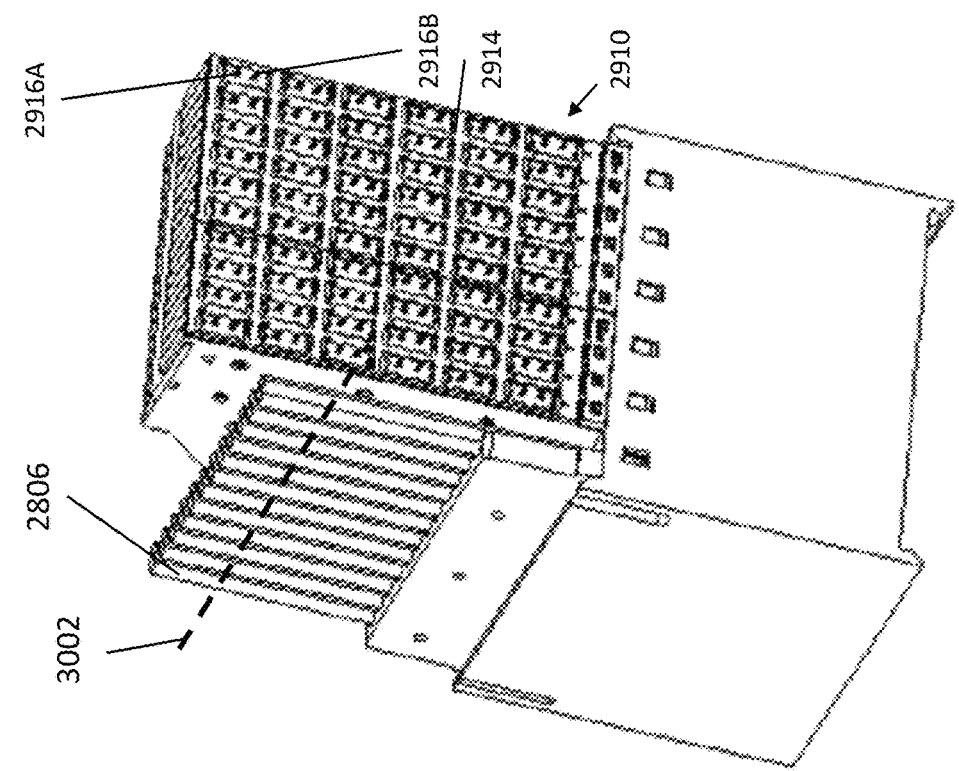
FIG. 2B is an isometric view of the connector of FIG. 2A, showing a mounting interface of the connector, according to some embodiments.
Figure 2A:
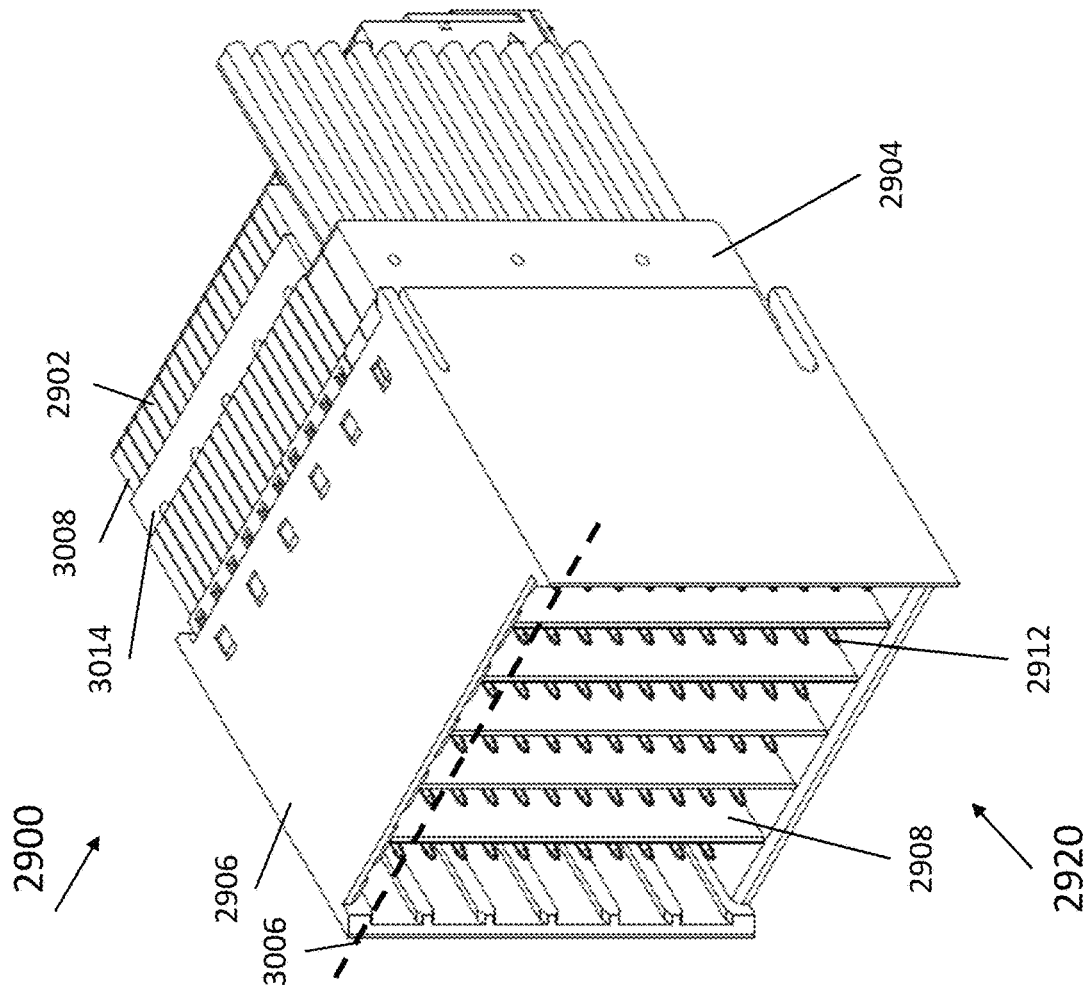
FIG. 2A is an isometric view of a connector of an electrical interconnection system, showing a mating interface of a connector, according to some embodiments.

FIG. 2A-2B illustrate isometric views of connector 2900, looking from a mating interface 2920 and a mounting interface 2910 respectively. Connector 2900 may include an extender shell 2906 holding both the first type connector units 2902 and the second type connector unit 2904. The connector units may include signal conductors having mating contact portions 2912, contact tails 2914, and intermediate portions (not shown) that extend between the contact tails and the mating contact portions. The mating contact portions are shaped as pins in the illustrated embodiment. The pins are arranged to form pairs, with each pair extending parallel to direction 3006, and pairs aligned in column direction 3002, forming an array of pairs. The extender shell may include dividers 2908. The pairs of mating contact portions in each column may be separated by a divider.

In this example, the first type connector units 2902 include wafers 3008. Rear portions of the wafers may be held by a support member 3014. In the illustrated embodiment, connector 2900 includes 10 wafers 3008. A wafer 3008 includes 6 wafer modules held by a housing made by two halves 3018A and 3018B. Each module includes a pair of differential signal conductors 2916A, 2916B.

As illustrated, the pairs of signal conductors within each of wafers 3008 may be aligned in column direction 3002. To achieve the orientation of pins at the mating interface illustrated in FIG. 3A, orthogonal extender modules, such as extender modules 2000 may be attached to the mating interfaces of the wafers 3008. FIGS. 3A-3E illustrate that connector 2900 may further include a plurality of extender modules 3010 attached to the mating ends of wafers 3008. Two identical extender modules 3010 may also form an extender module assembly 3012.

A plurality of wafers and a plurality of extender modules may be held by one or more support members 3004. In the embodiment illustrated, support members 3004 are implemented as at least two separate components 2902A and 2902B. However, any suitable number and shape of components may be used to form a support member. Additional components, for example, may hold the wafers at an opposing surface and/or at the sides of the structure shown. Alternatively or additionally, support member 3004 may be a housing, having an opening receiving and securing the wafers.

Figure 3A:
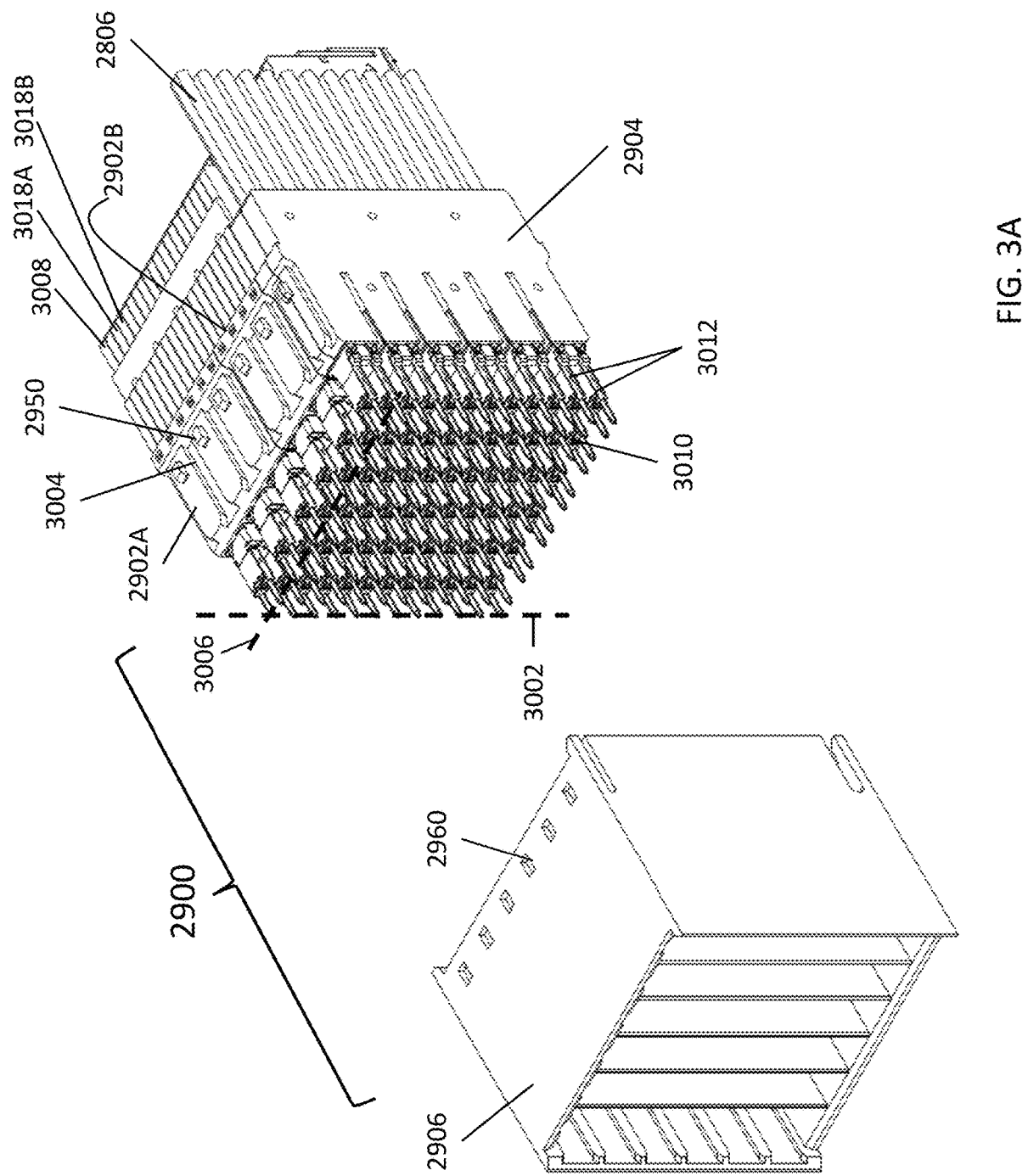
Figure 3C:
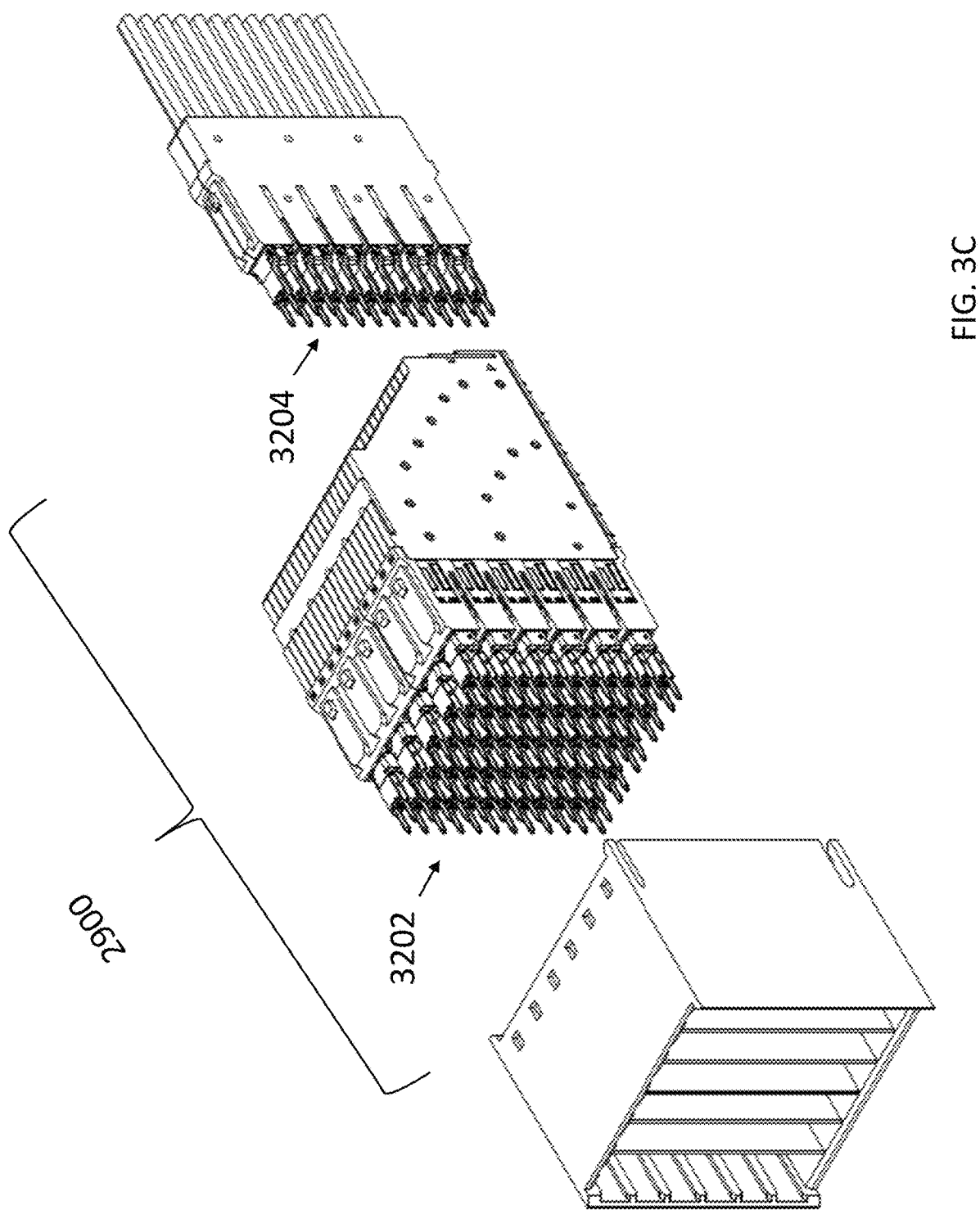
Figure 3E:
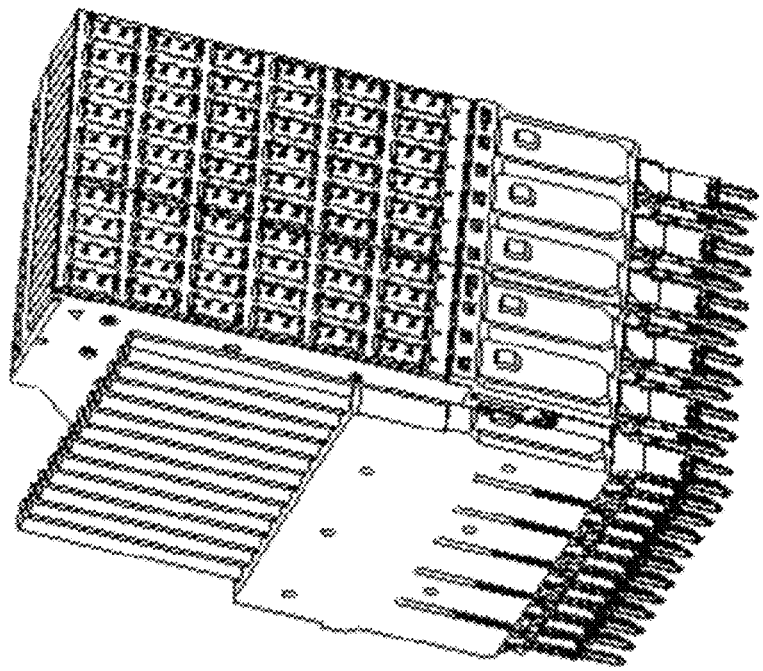
FIG. 3E is an isometric view of connector units of the connector of FIG. 2B, according to some embodiments.
Figure 3D:
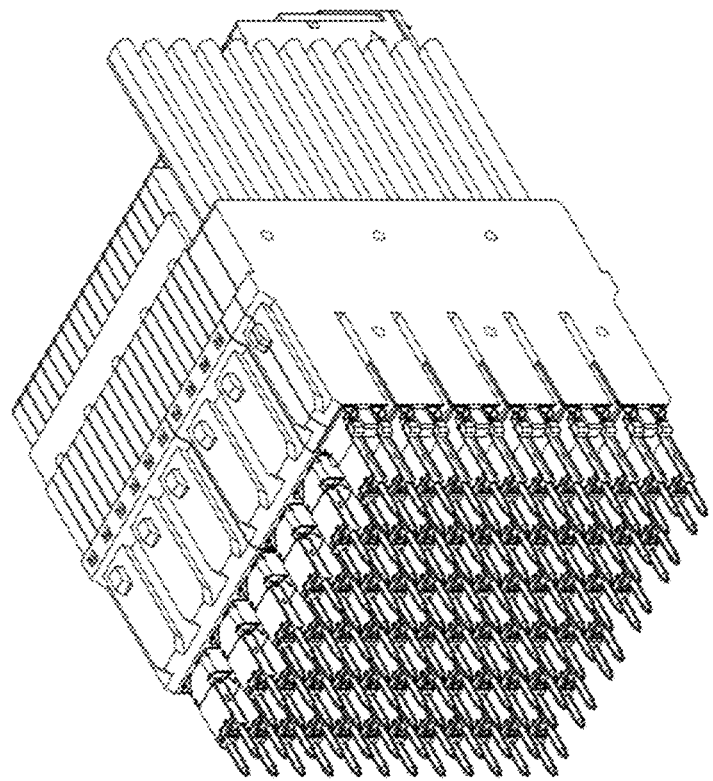
FIG. 3D is an isometric view of connector units of the connector of FIG. 2A, according to some embodiments.

In the embodiment of FIG. 3A, member 2902A holds six wafers and member 2902B holds four wafers. The wafers held by 2902A are collectively attached to 24 extender modules 3010, and the wafers attached to member 2902B are collectively attached to 36 extender modules 3010. As each column of extender modules attaches to two wafers, those two wafers, and attached extender modules, may be regarded as a first type "unit," and a connector may be formed with any suitable number of such units.

However, it should be appreciated that each first type connector unit may be a subassembly of any suitable number of components to implement any suitable number of columns of conductive elements or may be implemented as a single component or in any other suitable way. Using wafers and extender modules as illustrated, each first type connector unit may be formed from a multiple of two wafers, such as two, four, six or eight wafers and a multiple of that number of extender modules, the multiple being equal to the number of signal conductors in one wafer, but the application is not limited in this regard.

If multiple units are used, the connector units may be held together by a support member. In the embodiment illustrated, extender shell 2906 acts as a support member. The support member 3004 may include retaining features 2950 to engage with corresponding features 2960 on the extender shell 2906. It should be appreciated, however, that support members 3004 may, in some embodiments, be omitted, if wafers are attached directly to extender shell 2906 or, if other supporting structures are used to hold the components of the connector together.

In FIGS. 3A-3E, the mating contact portions of the wafers 3008 are covered by the support members 3004 and not shown. However, the mating contact portions may be configured. Each wafer module of a wafer 3008 may include a pair of differential signal conductors. The mating contact portions of the wafer modules may be configured as receptacles adapted to receive the first mating contact portions of the extender modules, which may be configured as pins. The mating contact portions of the wafer modules in a wafer may be aligned in the direction of column 3002. Adjacent wafer modules, each from one of the two wafers 3008 in a first type connector unit 2902, may receive first mating contact portions of an extender module assembly 3012. As a result, second mating contact portions of the extender module assemblies may form an array 3202, in which pairs of differential signal conductors may be aligned in a direction of column 3006 perpendicular to the direction of column 3002.

In the illustrated example, there is one second type unit 2904. To be complementary with the first type units, the illustrative second type unit 2904 includes 12 cables 2806 aligned in a direction of column 3002. Each second type unit 2904 may include a plurality of modules 3100 held by a unit housing 3102. The plurality of modules in a second type unit may be aligned in the direction of column 3002. Each module 3100 may include a module housing 3112 holding a pair of signal conductors 3104A, 3104B. The pair of signal conductors are separated in the direction of column 3006. The mating contact portions of the second type units may form an array 3204. The arrays 3202 and 3204 together may form the mating interface 2920 of the connector 2900.

The mating contact portions of the signal conductors are illustrated as pins. However, other configurations may be adopted, e.g., receptacles. The contact tails (not shown) of the signal conductors are attached with cables 2806. The attachment interface between the contact tails and the cables are protected by at least the unit housing. Each cable may include a pair of wires, each of which is attached to a respective contact tail of a pair of signal conductors of a module. In some embodiments, the cables may be twin-ax cables. A shield surrounding the conductors of the twin-ax cable may be attached to a shield surrounding the conductive elements in a respective module 3100. The unit housing 3102 may extend farther in the direction of cable length than support members 3004 such that the attachment interface between the modules 3100 and the cables 2806 are covered.

FIGS. 4A-4B illustrate isometric views of a second type connector unit with cables attached to form a cable assembly 3400. A cable assembly 3400 may include an assembly housing 3402 holding a plurality of cable assembly modules 3420. Here, housing 3402 is made from two halves 3402A and 3402B that are secured together, capturing modules 3420 between them. These components may be held together through the use of adhesive, interference fit, heat staking or other suitable way.

The housing 3402 and the modules 3420 may form a second type connector unit. In the embodiment illustrated, each of the modules 3420 has a pair of signal conductors, and the modules 3420 are arranged such that the second type connector unit has two columns of signal conductors.

FIG. 4C illustrates an isometric view of a cable assembly module 3420, which may include a module 3408 of a second type connector unit 3404 and a cable 3406. The module 3408 may include a pair of signal conductors 3410A, 3410B held by a module housing 3412. Module 3408 may provide a mating interface matching the mating interface provided by each extender module used in forming the first type connector units.

Conductors of the cables such as wires may be attached to signal conductors within modules 3408 in any suitable way. However, in accordance with some embodiments, the cable conductors may be attached to edges of the signal conductors so as to provide a conducting structure of substantially uniform thickness and/or substantially uniform spacing between the conductive elements. For example, the thickness, including both the thickness of the conductor of the cable, the signal conductor and any weld, solder or other material to fuse the two may be no more than 10% greater than the thickness of the stock used to form the signal conductor. In some embodiments, the variation in thickness between the cable attachment and the stock thickness may be less than 25% or less than 50%. More generally, the variation in thickness may be less than the variation that might result from a conventional approach of attaching the cable conductor at the broadside to connector signal conductor, which might increase the thickness of the conducting path by 100% or more. Likewise, the separation at the attachment location may be relatively small, such as differing from the separation at the mating interface by no more than 10%.

Such a connection is illustrated in FIGS. 5A and 5B. FIG. 5A illustrates an isometric view of the pair of signal conductors 3410A, 3410B. Signal conductors 3410A, 3410B may represent signal conductors within a module 3408 or in any other cable connector. The signal conductors may include contact tails 3510, mating contact portions 3520, and intermediate portions 3530 that extend between the contact tails and the mating contact portions. The signal conductors may jog towards opposite directions in transition regions 3514, resulting a space s1 between the contact tails different from a space s2 between the intermediate portions and, in the embodiment illustrated, between the mating contact portions. In some embodiments, s1 may be larger than s2. The contact tails 3510 may include broadsides 3502 and edges 3504 joining the broadsides. The pair of signal conductors may be held with the contact tails in an edge-to-edge configuration, with an edge 3504A of signal conductor 3410A facing an edge 3504B of signal conductor 3410B. The mating contact portions 3520 may be configured as pins. In some embodiments, the pins may be made by rolling metal sheets.

FIG. 5B illustrates an isometric view of a cable 3406 attached to the pair of signal conductors 3410A, 3410B. The cable 3406 may include a pair of conductive elements 3510A, 3510B insulated by a dielectric portion 3512. Cable 3406 may additionally include a shield surrounding conductive elements 3510A, 3510B, which is not shown for simplicity. However, the shield may be attached to a shield or ground conductive in the cable connector.

Portions of the pair of conductive elements may be exposed out of the dielectric portion. The exposed portion of the conductive element 3510A may be attached to the edge 3504A of the signal conductor 3410A. The exposed portion of the conductive element 3510B may be attached to the edge 3504B of the signal conductor 3410B. The attachment may be made in any suitable way, such as by welding, soldering, or brazing. For example, laser welding may be used. For example, a laser welding operation may be performed in which a laser is aimed in a path along the edge of the conductive element, fusing the wire in the cable to the edge of the conductive element as the laser's point of focus changes.

In some embodiments, the laser may be controlled to form a running fillet joint between each conductive element of the cable and the edge of the signal conductor in the connector. The inventors have found that such a joint may be more reliable and more repeatable than a weld through a wire. A suitable weld may be formed with a commercially available green laser, but any suitable welding equipment may be used.

Operations such as welding, soldering, or brazing without any filler metal or other fusible material result in directly fusing the conductive elements of the cable to the conductive elements of the connector, thereby avoiding the bulk of conductive material that might be present if other attachment techniques, such as soldering using a filler metal, were used. Reducing the bulk of conductive material used for attachment may reduce changes in impedance, which can contribute to desirable electrical properties. However, in some embodiments, solder or other fusible material may be added to facilitate attachment.

Cable conductors may be attached to edges of conductive elements of any suitable shape in a connector. FIGS. 6A-6D illustrate a method of making a cable connector. FIG. 6A illustrates a plan view of a mounting interface 3640 between a structure 3630 and a cable 3606. FIG. 6B is an elevation view of the mounting interface 3640, illustrating the relatively small additional thickness at the attachment location. The structure 3630 may include a pair of signal conductors 3610A and 3610B joined by a tie bar 3602. The contact tails of the signal conductors may jog in opposite directions and away from the tie bar through transition regions 3614. The structure 3630 may be stamped from a sheet of metal, such that the dimensions of that structure may be accurately controlled by a stamping die.

The cable 3606 may include a pair of conductive elements 3620A, 3620B, each of which is attached to one of opposing edges of the signal conductors 3610A, 3610B. The pair of signal conductors 3610A and 3610B is spaced from each other by a distance d1 to accommodate the cable 3606. The distance d1 may be controlled by a width W of the tie bar 3602 and/or the degree of slopes in the transition regions 3614. This distance may be accurately controlled by the stamping.

FIG. 6C illustrates a plan view of a mounting interface 3642 between a structure 3630 and a cable 3606. FIG. 6C illustrates that an insulative housing 3650 has been molded over structure 3630. Housing 3650 may be molded using an insert molding operating or molded in any other suitable way. Tie bar 3602 has then been severed. In this configuration, conductive elements 3610A and 3610B have been separated. Spacing between conductive elements 3610A and 3610B is nonetheless maintained as both are embedded in housing 3650.

With tie bar 3602 severed, mating contacts 3604A and 3604B on conductive elements 3610A and 3610B may be formed to provide any suitable shape. Any suitable metal forming technique may be used. For example, the edges may be coined to provide mating contacts that are blades. Alternatively or additionally, the mating contacts may be rolled to provide mating contacts that are pins. As yet a further variation, the mating contacts may be shaped as single beam contacts, dual-beam contacts or multi-beam contacts. As a further alternative, separate components may be attached to conductive elements 3610A and 3610B, such as to form a multi-beam structure or to provide a receptacle.

The forming operations may leave mating contacts 3604A and 3604B spaced from each other by a distance d2, measured edge-to-edge. In the embodiment illustrated, d2 may approximate d1. For example, d2 may differ from d1 by 10% or less, or in some embodiments, 25% or 50% or less.

However, it is not a requirement that the separation between edges be uniform over the entire length of the contacts. The edges of the contacts at the attachment region may taper towards each other or may taper away from each other in a direction along the elongated axis of mating contacts 3604A and 3604B. Such a configuration may provide a gradual impedance transition from the cable to the mating interface of the connector. Alternatively or additionally, the shape of the conductive elements 3610A and 3610B may vary over the length, such as to provide a wider or narrower width inside the housing relative to outside. As an example of a further variation, even if the opposing edges of conductive elements 3610A and 3610B are shaped to provide a uniform spacing d2 along the length of the conductive elements, the width of the conductive elements in the attachment may be controlled, even varying along the length of the conductive elements, by changing in the profile of the outer edges of conductive elements 3610A and 3610B. The outer edges, for example, may taper toward or away from each other.

The inventors have recognized and appreciated techniques for reliably joining a cable to an edge of a conductive element so as to provide cable terminations that yield interconnections with high signal integrity. Referring now to FIGS. 7A-7C, one embodiment of an attachment interface for joining a conductor of a cable (such as a wire) to an edge of a conductive element is described in more detail, using a contact tail of a signal conductor of a connector as an example. Similar to the embodiment described above in connection with FIG. 5B, FIG. 7A illustrates an isometric view of a cable 3706 attached to the pair of conductive elements, here shown as signal conductors 3410A, 3410B. The cable 3706 also may include a pair of conductive elements, here shown as conductors 3710A, 3710B (e.g., conductive wires) insulated by a dielectric portion 3712. Cable 3706 may additionally include a shield surrounding conductors 3710A, 3710B, which is not shown for simplicity. However, the shield may be attached to a shield or ground conductor in the cable connector. Portions of the pair of conductors may be exposed out of the dielectric portion. As described below, the exposed portion of the conductors 3710A may be attached to an edge of the signal conductor 3410A, and the exposed portion of the conductor 3710B may be attached to an edge of the signal conductor 3410B.

FIG. 7B shows a cross section taken along line B-B in FIG. 7A. In particular, FIG. 7B illustrates an attachment interface 3730 between the conductor 3710B (e.g., a wire) of the cable 3706 and the contact tail 3510 of the signal conductor 3410B of a connector. As illustrated, the generally round shape of the conductor 3710B results in a small contact area at the attachment interface 3730. The inventors have recognized and appreciated that this small contact area may lead to a poor quality joint, may lead to impedance discontinuities at the attachment interface, and/or may require the use of a relatively large amount of solder, braze, or other joining material to achieve a suitable joint; the inventors also have recognized that each of these may lead to undesirable signal degradation. Accordingly, in some embodiments, such as the embodiment illustrated in FIG. 7C, the conductor 3710B may be deformed prior to joining with the contact tail 3510 to provide a generally flattened contact area along the attachment interface 3730. Such a flattened contact area may provide a larger contact area between the conductor 3710B and the edge of the contact tail 3510, which may aid in maintaining a substantially constant impedance through the attachment interface and/or may facilitate joining the conductor to the contact tail with minimal or no additional joining material.

Additionally, as illustrated in FIG. 7B, in some embodiments, a diameter of the signal conductor 3710B (e.g., wire) of the cable 3706 may be larger than a thickness of the contact tail 3510 off the signal conductor 3410B of the connector. After deforming the signal conductor 3710B to form a flattened portion, the thickness of the flattened portion may be substantially equal to the thickness of the contact tail 3510, as illustrated in FIG. 7C. The inventors have recognized and appreciated that such flattening of the signal conductor 3710B may result in a joint structure that is more uniform in width and thickness compared to a joint formed without deforming the signal conductor 3710B, which may aid in maintaining a substantially constant impedance through the joint.

In some embodiments, a thickness of a flattened portion of signal conductor 3710B of the cable 3706 may be between about 75% and about 150% of a thickness of the contact tail 3510, and in some instances, the flattened portion of the signal conductor 3710B may have a thickness that is substantially equal to the thickness of the contact tail 3510. Additionally, in some embodiments, the thickness of the flattened portion of the signal conductor 3710B may be between about 50% and 100% of the diameter of the signal conductor within the cable 3706 (i.e., the diameter of the undeformed signal conductor 3710B). For instance, the thickness of the flattened portion may be between about 50% and 75% of the diameter of the signal conductor within the cable. The current disclosure is not limited to any particular method for flattening a conductor of a cable. For example, the conductor 3710B may be pressed against the edge of the contact tail 3510 during the joining process with a contact force sufficient to at least partially deform the conductor. In this manner, the conductor may be compressed between a tool (not depicted) and the edge of the contact tail to achieve a desired degree of deformation and flattening of the conductor, and thus, a desired contact area at the attachment interface. Such a tool may be implemented, for example, with a hardened member between conductors 2710A and 3710B. That portion may have a width, equal to a desired spacing between conductors 2710A and 3710B. Such a tool may also have members constraining motions of contact tails 3510. In operation, the tool might apply force on the ends of conductors 2710A and 2710B, in a direction parallel to the edges of contact tails 3510 so as to compress the conductors at the attachment interface 3730. Such compression may result in the ends of conductors 2710A and 2710B having a thickness approximating the thickness of the contact tails 3510. As displacement of the metal of conductors 2710A and 2710B is constrained on three sides by the tool, the metal of conductors 2710A and 2710B displaced by compression will move towards the contact tails 3510, creating flattened surfaces on the conductor facing the edges of contact tails 3510.

Alternatively or additionally, a separate tool may be used to partially or fully deform and flatten at least a portion of the conductor 3710B prior to joining with the contact tail 3510.

Shaping the conductors prior to attachment facilities a more robust attachment and provides for less changes in impedance. Further improvements may be achieved based on material selection and/or regulation of energy used to form the attachment. As discussed above, some aspects of the current disclosure relate to selecting materials for a conductor of a cable (e.g., a wire) and a contact tail of a signal conductor of a connector to facilitate joining, such as by providing desired material properties for the joining process. In some embodiments such thermodynamic properties may be achieved by coating one or both of the conductor and contact tail. For example, FIG. 8A depicts a cross sectional view of an attachment interface 3830 between a conductor 3812 of a cable and a contact tail 3810 of a connector, similar to the embodiment discussed above in connection with FIGS. 7A-7C. As illustrated, the contact tail 3810 comprises a first coating material 3816 at least partially surrounding a first base alloy 3814 of the contact tail. Similarly, the conductor 3812 comprises a second coating material 3820 at least partially surrounding a second base alloy 3818 of the conductor. While this embodiment utilizes first and second coating materials associated with the contact tail and conductor, it should be understood that the current disclosure is not limited to connectors having only two coating materials. For example, some embodiments may employ three or more coating materials on a contact tail and/or conductor.

In one embodiment, the first coating material 3816 and first base alloy 3814 may be selected such that the first coating material is soluble within the first base alloy (e.g., soluble over a substantial range of composition of the mixture of the first base alloy and first coating material) such that the first coating material and first base alloy may interdiffuse within each other to form a single phase solid solution. The second coating material 3820 and second base alloy 3818 may be selected such that the materials form a eutectic system. Specifically, a mixture of the second coating material and second base alloy may exhibit a lower melting temperature than either the melting temperature of the second base alloy or the second coating material. In some instances, the second coating material may exhibit some solid phase solubility in the and second base alloy (e.g., over a range of compositions of up to at least 1%, up to at least 5%, up to at least 10%, up to at least 20%, up to at least 30% or more of the second coating material in the second base alloy). In this manner, the dissolution of the second coating material in to the second base alloy may, in effect, lower the melting point of the second base alloy, as discussed above.

In some embodiments, the first and second base alloys may comprise one or more common primary component elements. For example, the first and second base alloys may both be copper alloys. However, other compositions and/or combinations of compositions also may be suitable, as would be apparent to one of skill in the art.

Referring now to FIG. 8B, attachment of the conductor 3812 to the contact tail 3810 is described in more detail. The attachment may be made using a suitable heat treating process, such as by heating a first side of the attachment interface 3830 via exposure to laser energy (e.g., a laser welding process). Compared to a typical laser welding or similar process in which the supplied energy must be sufficient to melt the materials along the entire attachment interface (thereby forming a heat effected zone that extends along the entire length of the joint, which can result in undesirable effects such as ablation and/or pitting), embodiments described herein may be joined with reduced power levels. For example, a relatively small heat effected zone 3832 may be formed at the end of the attachment interface 3830 to which the heat is applied, and a metallurgical bond 3834 may be formed along the remainder of the attachment interface. In particular, the heat applied during the heat treatment process may be sufficient to reach the reduced melting point of the mixture of the second base alloy 3818 and second coating material 3820 such that the mixture can flow into the attachment interface 3830 (e.g., due to gravitational and/or capillary forces). Depending on the particular embodiment, the heat effected zone 3832 may extend along less than 50%, less than 40%, less than 30%, less than 20%, less than 10%, or less than 5% of the attachment interface 3830. Similarly, the metallurgical bond 3834 may extend along more than 50%, more than 60%, more than 70%, more than 80%, more than 90%, or more than 95% of the attachment interface 3830.

In some embodiments, the metallurgical bond 3834 may extend along a substantial portion of a length of the attachment interface 3830 along a direction parallel to the length of the conductor 3812. For example, the metallurgical bond may extend along at least 50%, at least 75%, at least 90% or more of the length of the attachment interface. In some exemplary embodiments, the length of the attachment interface may be between about 0.005 inches and about 0.02 inches (e.g., between about 0.01 inches and about 0.015 inches), and the metallurgical bond may extend along a length of at least 0.0025 inches, at least 0.005 inches, at least 0.01 inches, at least 0.015 inches, at least 0.018 inches or more of the attachment interface.

Moreover, elevated temperatures at an attachment interface during the heat treatment process described above may result in faster diffusion of the various materials. Consequently, a metallurgical bond 3834 may be formed along the attachment interface 3830 via the interdiffusion of the first base alloy 3814, first coating material 3816, second base alloy 3818, and second coating material 3820. In particular, the metallurgical bond 3834 may form a region along the attachment interface in which the first and second base alloys and first and second coating materials form a substantially homogeneous microstructure without a well-defined interface between the conductor 3812 and contact tail 3810.

Although the metallurgical bond 3834 is depicted as extending substantially along the entire thickness of the attachment interface below the heat effected zone 3832, it should be understood that other configurations may be suitable. For example, in some embodiments a suitable bond may be formed with a metallurgical bond along only a portion of the thickness of the attachment interface. Alternatively or additionally, in some embodiments, the attachment interface may be heated from both sides such that heat effected zones may be formed at both sides ends of the attachment interface (along the thickness of the attachment interface) and metallurgical bonds may extend from each heat effected zone, or may span the attachment interface between the heat effected zones. In some embodiments, the heat effected zone(s) may comprise a region in which the applied heat is sufficient to melt at least a portion of the base alloys and form a liquid mixture, which may subsequently solidify into one or more distinct phases. In such embodiments, the heat effected zone(s) may be characterized as welded portions of an attachment interface. Alternatively or additionally, the heat affected zone(s) may comprise regions in which the applied heat was sufficient to create a change in microstructure relative to the microstructure of the base alloy(s) and/or coating(s). Moreover, in some embodiments, a ratio of the thickness of the metallurgical bond in a direction along the thickness of the contact tail to the total thickness of the heat affected zone(s) may be at least 2:1, at least 3:1, at least 4:1, at least 5:1, or more.

Figure 9C:
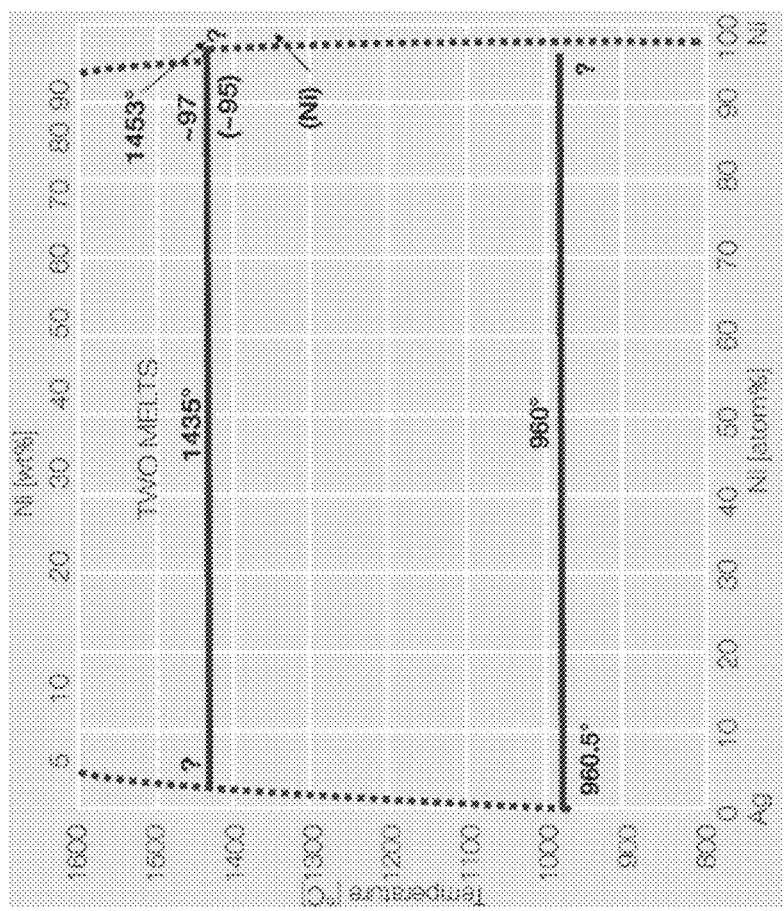
FIG. 9C shows a silver-nickel phase diagram, and illustrates an example of a material system exhibiting insoluble behavior, according to some embodiments.

In one exemplary embodiment, the contact tail may comprise a precipitation hardened copper alloy as the first base alloy, and the first coating material may be nickel. As shown in the phase diagram illustrated in FIG. 9A, nickel and copper would be regarded as completely soluble in each other at room temperature. As a result, copper from the first base alloy may diffuse into the nickel coating such that some copper is present near the surface of the first coating material (and similarly, some of the nickel coating may diffuse into the copper base alloy of the contact tail). The conductor of the cable may comprise electrolytic tough pitch (ETP) copper as the second base alloy, and the second coating material on the conductor may be silver. As shown in the phase diagrams illustrated in FIGS. 9B and 9C, silver and copper form a eutectic system with some limited solubility of silver into copper, while silver and nickel would be regarded as completely insoluble with one another. As a result, it is typically difficult to join silver coated parts to nickel coated parts. However, using the techniques described herein, upon heating the attachment interface between the conductor and the contact tail, a silver-copper mixture may melt and flow into to the attachment interface, and some of the copper may diffuse into the copper-nickel solid solution of the contact tail. Similarly, for example, some of the copper from the contact tail may diffuse into the copper silver mixture. In this manner, the interdiffusion of the copper, nickel, and silver at the attachment interface may lead to the formation of a metallurgical bond along at least a portion of the attachment interface.

Having thus described several embodiments, it is to be appreciated various alterations, modifications, and improvements may readily occur to those skilled in the art. Such alterations, modifications, and improvements are intended to be within the spirit and scope of the application. Accordingly, the foregoing description and drawings are by way of example only. Various changes may be made to the illustrative structures, materials and processes shown and described herein.

For example, while certain combinations of alloys and/or materials were described above in connection with one illustrative embodiment, it should be understood that other compositions may be suitable. Moreover, the current disclosure is not limited to configurations in which the first and second base alloys are different types of alloys and/or the first and second coating materials comprise different materials. For example, in one embodiment, a silver coating could be employed on both the conductor and the contact tail. Accordingly, it should be understood that the current disclosure is not limited to metallurgical bonds formed from a soluble material system (e.g., Ni—Cu) and a eutectic or eutectoid system (e.g., Ag—Cu), and that one or both of these material systems may be used in connection with either of the conductor of the cable and the contact tail of the connector. Moreover, the various alloys or metals used for the base alloys and/or coatings may be selected for any of a variety of purposes, including, but not limited to, providing a desired electrical conductivity, corrosion resistance, and/or melting point reduction. For instance, in certain embodiments, tin may be incorporated into one or more coating materials (such as a silver or nickel coating) to further reduce the melting point of the mixture. In another embodiment, a silver-plated copper wire may be joined to a bare copper contact tail.

Additionally, while embodiments have been described in connection with joining a conductor (such as a wire) of a cable to a contact tail of a connector, it should be understood that the techniques described herein may be suitable for forming other types of joints, such as between contact tails on signal conductors of different connectors.

As another example, a method of manufacturing a module for a cable connector was described in connection with FIGS. 6A-6D. Steps of the method may be performed in an order other than as described. Cable conductors may be attached after a housing a formed and/or after a time bar is severed. Moreover, additional examples of methods for attaching a cable to a connector were described in connection with FIGS. 7A-8B. Steps of these methods may be combined in any suitable manor, including with the steps described above in connection with FIGS. 6A-6D. For example, the joining techniques described in connection with FIGS. 7A-8B may be combined with the techniques utilizing a tie bar described in connection with FIGS. 6A-6D.

As another example, techniques are described for improving signal quality at the mating interface of an electrical interconnection system. These techniques may be used alone or in any suitable combination. Furthermore, the size of a connector may be increased or decreased from what is shown. Also, it is possible that materials other than those expressly mentioned may be used to construct the connector. As another example, connectors with four differential signal pairs in a column are used for illustrative purposes only. Any desired number of signal conductors may be used in a connector.

As another example, an embodiment was described in which a different front housing portion is used to hold connector modules in a connector configuration versus an orthogonal configuration. It should be appreciated that, in some embodiments, a front housing portion may be configured to support either use.

Manufacturing techniques may also be varied. For example, embodiments are described in which the connector 600 is formed by organizing a plurality of wafers onto a stiffener. It may be possible that an equivalent structure may be formed by inserting a plurality of shield pieces and signal receptacles into a molded housing.

As another example, connectors are described that are formed of modules, each of which contains one pair of signal conductors. It is not necessary that each module contain exactly one pair or that the number of signal pairs be the same in all modules in a connector. For example, a 2-pair or 3-pair module may be formed. Moreover, in some embodiments, a core module may be formed that has two, three, four, five, six, or some greater number of rows in a single-ended or differential pair configuration. Each connector, or each wafer in embodiments in which the connector is waferized, may include such a core module. To make a connector with more rows than are included in the base module, additional modules (e.g., each with a smaller number of pairs such as a single pair per module) may be coupled to the core module.

As a further variation, FIGS. 3A-3E illustrate a connector in which columns of signal conductors are formed by wafers that have only signal conductor with contact tails for mounting to a printed circuit board or signal conductors with tails terminated to cables. It is not a requirement that all of the signal conductors within each wafer have the same configuration. A wafer, for example, may have some signal conductors configured to mount to a printed circuit board and others configured to terminate a cable. Further, it is not a requirement that the connector be assembled from wafers at all. In some embodiments, modules, each containing one, a pair or more of signal conductors may be held together as a connector.

Furthermore, although many inventive aspects are shown and described with reference to a orthogonal connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, daughterboard connectors, midplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, spring contacts, solderable pins, etc., as aspects of the present disclosure are not limited to the use of any particular mechanism for attaching connectors to printed circuit boards.

Further, signal and ground conductors are illustrated as having specific shapes. In the embodiments above, the signal conductors were routed in pairs, with each conductive element of the pair having approximately the same shape so as to provide a balanced signal path. The signal conductors of the pair are positioned closer to each other than to other conductive structures. One of skill in the art will understand that other shapes may be used, and that a signal conductor or a ground conductor may be recognized by its shape or measurable characteristics. A signal conductor in many embodiments may be narrow relative to other conductive elements that may serve as reference conductors to provide low inductance. Alternatively or additionally, the signal conductor may have a shape and position relative to a broader conductive element that can serve as a reference to provide a characteristic impedance suitable for use in an electronic system, such as in the range of 50-120 Ohms.

Alternatively or additionally, in some embodiments, the signal conductors may be recognized based on the relative positioning of conductive structures that serve as shielding. The signal conductors, for example, may be substantially surrounded by conductive structures that can serve as shield members.

Further, the configuration of connector modules and extender modules as described above provides shielding of signal paths through the interconnection system formed by connector modules and extender modules in a first connector and connector modules in a second connector. In some embodiments, minor gaps in shield members or spacing between shield members may be present without materially impacting the effectiveness of this shielding. It may be impractical, for example, in some embodiments, to extend shielding to the surface of a printed circuit board such that there is a gap on the order of 1 mm. Despite such separation or gaps, these configurations may nonetheless be regarded as fully shielded.

Moreover, examples of an extender module are pictured with an orthogonal configuration. It should be appreciated that, without a 90 degree twist, the extender modules may be used to form a RAM, if the extender module has pins or blades at its second end. Other types of connectors may alternatively be formed with modules with receptacles or mating contacts of other configurations at the second end.

Moreover, the extender modules are illustrated as forming a separable interface with connector modules. Such an interface may include gold plating or plating with some other metal or other material that may prevent oxide formation. Such a configuration, for example, may enable modules identical to those used in a connector to be used with the extender modules. However, it is not a requirement that the interface between the connector modules and the extender modules be separable. In some embodiments, for example, mating contacts of either the connector module or extender module may generate sufficient force to scrape oxide from the mating contact and form a hermetic seal when mated. In such an embodiment, gold and other platings might be omitted.

Connectors configured as described herein may provide desirable signal integrity properties across a frequency range of interest. The frequency range of interest may depend on the operating parameters of the system in which such a connector is used, but may generally have an upper limit between about 15 GHz and 50 GHz, such as 25 GHz, 30 or 40 GHz, although higher frequencies or lower frequencies may be of interest in some applications. Some connector designs may have frequency ranges of interest that span only a portion of this range, such as 1 to 10 GHz or 3 to 15 GHz or 5 to 35 GHz.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that may provide desirable signal integrity for high frequency signals, such as at frequencies in the GHz range, including up to about 25 GHz or up to about 40 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

Examples of arrangements that may be implemented according to some embodiments include the following:

1. A connector assembly, comprising:
   a first signal conductor having a first contact tail, the first contact tail including an edge having a first planar surface; and
   a first wire extending from a cable, wherein a portion of the first wire is at least partially flattened to form a second planar surface, and wherein the first wire is attached to the edge of the first contact tail with the second planar surface of the first wire in contact with the first planar surface of the first contact tail.

2. The connector assembly of arrangement 1, further comprising:
   a second signal conductor having a second contact tail, the second contact tail including an edge having a third planar surface; and
   a second wire extending from the cable, wherein a portion of the second wire is at least partially flattened to form a fourth planar surface, and wherein the second wire is attached to the edge of the second contact tail with the fourth planar surface of the second wire in contact with the third planar surface of the second contact tail.

3. The connector assembly of arrangement 2, wherein the edge of the first contact tail and the edge of the second contact tail are opposing edges in a pair of signal conductors.

4. The connector assembly of arrangement 3, wherein the pair of signal conductors are configured as a differential pair.

5. The connector assembly of any of arrangement 3-4, wherein:
   the pair of signal conductors is a first pair of a plurality of pairs of signal conductors;
   each of the plurality of pairs of signal conductors has a pair of contact tails with opposing edges;
   the connector assembly comprises wires at least partially flattened to form planar surfaces attached to respective edges of each pair of contact tails of the plurality of pairs of signal conductors with the planar surfaces in contact with the opposing edges of the respective contact tails;
   the pairs of signal conductors are separated by shielding.

6. The connector assembly of arrangement 5, wherein:
   the plurality of pairs of signal conductors are disposed in a line.

7. The connector assembly of any of arrangement 5-6, wherein:
   the plurality of pairs of signal conductors are disposed in a plurality of parallel lines.

8. The connector assembly of any of arrangement 5-7, wherein:
   the wires attached to respective edges of each pair of contact tails comprise conductors of a twinax cable.

9. The connector assembly of any of arrangement 5-8, wherein:
   the wires attached to respective edges of each pair of contact tails are via metallurgical bonds.

10. The connector assembly of any of arrangement 2-9, wherein the first and third planar surfaces face one another.

11. The connector assembly of any of arrangement 1-10, wherein the first wire is joined to the first signal conductor via a metallurgical bond extending at least partially along an interface between the first planar surface and the second planar surface.

12. The connector assembly of arrangement 11, wherein a length of the interface along a direction parallel to a direction of extension of the wire is between about 0.005 inches and about 0.02 inches.

13. The connector assembly of arrangement 12, wherein the length of the interface is between about 0.01 inches and about 0.015 inches.

14. The connector assembly of any of arrangement 12-13, wherein the metallurgical bond extends along at least 50% of the interface.

15. The connector assembly of arrangement 14, wherein the metallurgical bond extends along at least 75% of the interface.

16. The connector assembly of arrangement 15, wherein the metallurgical bond extends along at least 90% of the interface.

17. The connector assembly of any of arrangement 1-16, wherein a thickness of the portion of the wire is between about 75% and about 150% of a thickness of the first contact tail.

18. The connector assembly of arrangement 17, wherein the thickness of the portion of the wire is substantially equal to the thickness of the first contact tail.

19. The connector assembly of any of arrangements 1-18, wherein a thickness of the portion of the wire is greater than about 50% of a diameter of the wire within the cable.

20. The connector assembly of arrangement 19, wherein the thickness of the portion of the wire is less than 75% of the diameter of the wire within the cable.

21. The connector assembly of any of arrangements 1-20, wherein:
   the first wire is attached to the edge of the first contact tail via a bond; and
   at least a portion of the bond is a metallurgical bond.

22. A connector assembly, comprising:
   a signal conductor having a contact tail, the contact tail comprising an edge; and
   a wire extending from a cable and attached to the edge of the contact tail via a bond extending along an attachment interface, wherein at least a portion of the bond is a metallurgical bond.

23. The connector of arrangement 22, wherein the metallurgical bond extends along at least 50 percent of the attachment interface.

24. The connector of any of arrangements 22-23, wherein the bond comprises a heat effected zone at a first end of the attachment interface.

25. The connector of any of arrangements 22-24, wherein the bond extends along the entire attachment interface.

26. The connector of any of arrangements 22-25, wherein the signal conductor comprises a first base alloy and a first coating material, and wherein the wire comprises a second base alloy and a second coating material.

27. The connector of arrangement 26, wherein the metallurgical bond comprises, at least in part, a region in which the first base alloy, first coating material, second base alloy, and second coating material are interdiffused with one another.

28. The connector of any of arrangements 26-27, wherein the first coating material is soluble in the first base alloy, and the second coating material and second base alloy form a eutectic material system.

29. The connector of any of arrangements 26-28, wherein the first and second base alloys comprise copper.

30. The connector of arrangement 29, wherein the first coating material comprises nickel and the second coating material comprises silver.

31. The connector of arrangement 30, wherein the second coating material further comprises tin.

32. The connector of any of arrangements 22-31, wherein at least a portion of the wire extending along the attachment interface is deformed such that a thickness of the portion is less than a diameter of the wire in the cable.

33. A method of forming an electrical connector, the method comprising:
bonding a wire of a cable to an edge of contact tail of a signal conductor along an attachment interface, at least in part, by interdiffusing at least a portion of a first material and a second material across the attachment interface to form a metallurgical bond.

34. The method of arrangement 33, wherein bonding the wire of the cable to the edge of the contact tail further comprises at least partially melting the first material and flowing the first material into the attachment interface.

35. The method of any of arrangements 33-34, wherein the first material comprises a first base alloy of the wire and a first coating material on the wire.

36. The method of arrangement 35, wherein the first base alloy and first coating material form a eutectic material system.

37. The method of any of arrangements 33-36, further comprising deforming at least a portion of the wire before bonding the wire to the contact tail.

38. The method of arrangement 37, wherein deforming at least a portion of the wire comprises flattening the portion of the wire.

39. The method of any of arrangements 33-38, wherein melting the first material comprises increasing the temperature of the first material to a temperature between about 800° C. and about 1100° C.

40. The method of any of arrangements 33-29, wherein the metallurgical bond extends along at least 50% of a length of the attachment interface.

41. The method of arrangement 40, wherein the metallurgical bond extends along at least 75% of a length of the attachment interface.

42. The method of arrangement 41, wherein the metallurgical bond extends along at least 90% of a length of the attachment interface.

43. A method of forming an electrical connector, the method comprising:
deforming a portion of a first wire of a cable to form a first planar surface; and
attaching the first wire to an edge of a first contact tail of a first signal conductor, at least in part, by contacting the first planar surface of the first wire to a second planar surface of the edge of the first contact tail.

44. The method of arrangement 43, further comprising:
deforming a portion of a second wire of the cable to form a third planar surface; and
attaching the second wire to an edge of a second contact tail of a second signal conductor, at least in part, by contacting the third planar surface of the second wire to a fourth planar surface of the edge of the second contact tail.

45. The method of arrangement 44, wherein the edge of the first contact tail and the edge of the second contact tail are opposing edges in a pair of signal conductors.

46. The method of arrangement 45, wherein the pair of signal conductors are configured as a differential pair.

47. The method of any of arrangements 45-46, further comprising attaching the wires to respective edges of the pair of contact tails via metallurgical bonds.

48. The method of any of arrangements 43-47, wherein deforming the portion of the first wire comprises flattening the portion of the first wire.

49. The method of arrangement 48, wherein after flattening, a thickness of the portion of the first wire is greater than about 50% of a diameter of the first wire within the cable.

50. The method of arrangement 49, wherein after flattening, the thickness of the portion of the first wire is less than about 75% of the diameter of the first wire within the cable.

51. The method of any of arrangements 48-50, wherein after flattening, a thickness of the portion of the first wire is between about 75% and about 150% of a thickness of the first contact tail.

52. The method of any of arrangements 43-51, wherein attaching the first wire to the edge of the first contact tail comprises forming a bond along the attachment interface, and wherein at least a portion of the bond is a metallurgical bond.

Accordingly, the present disclosure is not limited to the details of construction or the arrangements of components set forth in the following description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A connector assembly, comprising:
a signal conductor having a contact tail, the contact tail comprising broadsides and edges joining the broadsides; and
a wire extending from a cable and attached to an edge of the edges of the contact tail via a bond extending along an attachment interface, wherein:
at least a portion of the bond is a metallurgical bond,
at least one of the signal conductor and the wire comprises a coating material;
the metallurgical bond comprises atoms of the coating material; and the metallurgical bond extends along more than 50% of the attachment interface.

2. The connector assembly of claim 1, comprising:
a plurality of connector units comprising at least one first type connector unit and at least one second type connector unit, each of the plurality of connector units comprising two columns of signal conductors, the signal conductors each comprising a contact tail, a mating contact portion, and an intermediate portion connecting the contact tail and the mating contact portion, wherein:
the contact tails of the signal conductors of the at least one first type connector unit are configured for attachment to a printed circuit board, and
the at least one second type connector unit comprises the signal conductor and the wire.

3. The connector assembly of claim 1, wherein the attachment interface comprises a heat effected zone at a first end.

4. The connector assembly of claim 1, wherein at least a portion of the wire extending along the attachment interface is deformed such that a thickness of the portion is less than a diameter of the wire in the cable.

5. A connector assembly, comprising:
a signal conductor having a contact tail, the contact tail comprising broadsides and edges joining the broadsides; and
a wire extending from a cable and attached to an edge of the edges of the contact tail via a bond extending along an attachment interface, wherein at least a portion of the bond is a metallurgical bond, wherein the signal conductor comprises a first base alloy and a first coating material, and wherein the wire comprises a second base alloy and a second coating material.

6. The connector assembly of claim 5, wherein the metallurgical bond comprises, at least in part, a region in which the first base alloy, first coating material, second base alloy, and second coating material are interdiffused with one another.

7. The connector assembly of claim 5, wherein the first coating material is soluble in the first base alloy, and the second coating material and second base alloy form a eutectic material system.

8. The connector assembly of claim 5, wherein the first and second base alloys comprise copper.

9. A connector assembly, comprising:
a first signal conductor having a first contact tail, the first contact tail including broadsides and edges joining the broadsides; and
a first wire extending from a cable, wherein:
the first wire is attached to an edge of the edges of the first contact tail to form an attachment interface, and
at least a portion of the attachment interface between the first wire and the first contact tail comprises
a metallurgical bond, wherein the metallurgical bond comprises materials of the first wire and the first contact tail and at least one additional material forming a eutectic system with material of the first wire or the first contact tail.

10. The connector assembly of claim 9, further comprising:
a second signal conductor having a second contact tail, the second contact tail including broadsides and edges joining the broadsides; and
a second wire extending from the cable, wherein the second wire is attached to an edge of the edges of the second contact tail.

11. The connector assembly of claim 10, wherein:
the first signal conductor and the second signal conductor form a first pair of signal conductors, the first pair of signal conductors are held with the first and second contact tails in an edge-to-edge configuration;
the connector assembly comprises a plurality of pairs of signal conductors, each of the plurality of pairs of signal conductors has a pair of contact tails with opposing edges;
the connector assembly comprises wires at least partially flattened to form planar surfaces attached to respective edges of each pair of contact tails of the plurality of pairs of signal conductors with the planar surfaces in contact with the opposing edges of the respective contact tails; and
the pairs of signal conductors are separated by shielding.

12. The connector assembly of claim 11, wherein:
the wires attached to respective edges of each pair of contact tails comprise conductors of a twinax cable.

13. The connector assembly of claim 9, wherein the metallurgical bond extends along at least 50% of the attachment interface.

14. The connector assembly of claim 9, wherein a portion of the first wire is at least partially flattened to form the attachment interface, and a thickness of the portion of the first wire is between about 75% and about 150% of a thickness of the first contact tail.

15. A method of forming an electrical connector, the electrical connector comprising a signal conductor comprising a contact tail, the contact tail comprising broadsides and edges joining the broadsides, the method comprising:
bonding a wire of a cable to an edge of the edges of the contact tail of the signal conductor along an attachment interface, at least in part, by interdiffusing at least a portion of a first material and a second material across the attachment interface to form a metallurgical bond, wherein at least one of the first and second materials is a coating material.

16. The method of claim 15, wherein bonding the wire of the cable to the edge of the contact tail further comprises at least partially melting the first material and flowing the first material into the attachment interface.

17. The method of claim 15, further comprising deforming at least a portion of the wire before bonding the wire to the contact tail.

18. The method of claim 17, wherein deforming at least a portion of the wire comprises flattening the portion of the wire.

19. A method of forming an electrical connector, the electrical connector comprising a signal conductor comprising a contact tail, the contact tail comprising broadsides and edges joining the broadsides, the method comprising:
bonding a wire of a cable to an edge of the edges of the contact tail of the signal conductor along an attachment interface, at least in part, by interdiffusing at least a portion of a first material and a second material across the attachment interface to form a metallurgical bond, wherein the first material comprises a first base alloy of the wire and a first coating material on the wire.

20. The method of claim 19, wherein the first base alloy and first coating material form a eutectic material system.

* * * * *